US012368246B2

(12) United States Patent
Kim et al.

(10) Patent No.: US 12,368,246 B2
(45) Date of Patent: Jul. 22, 2025

(54) MULTI-BAND ANTENNA AND ELECTRONIC DEVICE INCLUDING THE SAME

(71) Applicant: SAMSUNG ELECTRONICS CO., LTD., Suwon-si (KR)

(72) Inventors: Dongyeon Kim, Suwon-si (KR); Youngsuk Yoo, Suwon-si (KR); Sumin Yun, Suwon-si (KR); Woosup Lee, Suwon-si (KR); Sukgi Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 347 days.

(21) Appl. No.: 17/951,854

(22) Filed: Sep. 23, 2022

(65) Prior Publication Data

US 2023/0052927 A1 Feb. 16, 2023

Related U.S. Application Data

(63) Continuation of application No. PCT/KR2022/010658, filed on Jul. 21, 2022.

(30) Foreign Application Priority Data

Aug. 11, 2021 (KR) ........................ 10-2021-0105766

(51) Int. Cl.
*H01Q 21/06* (2006.01)
*H01Q 1/24* (2006.01)
(Continued)

(52) U.S. Cl.
CPC ........... *H01Q 21/065* (2013.01); *H01Q 1/243* (2013.01); *H01Q 1/48* (2013.01); *H01Q 9/045* (2013.01)

(58) Field of Classification Search
CPC ............ H01Q 1/243; H01Q 1/38; H01Q 1/48; H01Q 21/065; H01Q 9/0414; H01Q 9/045; H01Q 9/0457
See application file for complete search history.

(56) References Cited

U.S. PATENT DOCUMENTS 8,717,245 B1 5/2014 Krivokapic et al.
10,734,726 B2 8/2020 Fujimoto
(Continued)

FOREIGN PATENT DOCUMENTS

CN 104319467 A 1/2015
CN 1107688006 A 2/2020
(Continued)

OTHER PUBLICATIONS

International Search Report (PCT/ISA/210) dated Oct. 31, 2022 issued by the International Searching Authority in International Application No. PCT/KR2022/010658.
(Continued)

*Primary Examiner* — Thien M Le
(74) *Attorney, Agent, or Firm* — Sughrue Mion, PLLC

(57) ABSTRACT

An antenna includes a first radiating layer including a first radiation patch, a slit formed in the first radiation patch, and a first feed point provided in the first radiation patch, a second radiating layer including a second radiation patch provided below the first radiation patch and a second feed point provided in the second radiation patch, a feeding layer including a coupling patch provided below the second radiation patch and at least one ground point provided in the coupling patch, a ground layer provided below the coupling patch, a feed line provided between the second radiation patch and the ground layer and including a third feed point, a signal via connecting the first feed point, the second feed
(Continued)

point, and the third feed point, and a ground via connecting the at least one ground point and the ground layer.

20 Claims, 32 Drawing Sheets

(51) Int. Cl.
*H01Q 1/48* (2006.01)
*H01Q 9/04* (2006.01)

(56) References Cited

U.S. PATENT DOCUMENTS

| | | | | |
|---|---|---|---|---|
| 2011/0032154 | A1* | 2/2011 | Chung | H01Q 9/0414 343/700 MS |
| 2015/0333407 | A1 | 11/2015 | Yamagajo et al. | |
| 2016/0365646 | A1* | 12/2016 | Higaki | H01Q 9/0457 |
| 2017/0012364 | A1* | 1/2017 | Yang | H01Q 9/42 |
| 2017/0093041 | A1* | 3/2017 | McMichael | H01Q 9/0464 |
| 2017/0093042 | A1* | 3/2017 | McMichael | H01Q 9/0428 |
| 2017/0125919 | A1 | 5/2017 | Chien et al. | |
| 2019/0058252 | A1* | 2/2019 | Kuo | H01Q 21/062 |
| 2019/0140362 | A1* | 5/2019 | Edenfield | H01Q 21/24 |
| 2020/0021011 | A1 | 1/2020 | Cooper et al. | |
| 2020/0303821 | A1 | 9/2020 | Lee et al. | |
| 2020/0408612 | A1* | 12/2020 | Wu | G01K 11/265 |
| 2020/0411986 | A1 | 12/2020 | Cooper et al. | |
| 2021/0005982 | A1 | 1/2021 | Han et al. | |
| 2021/0044018 | A1 | 2/2021 | Takaki et al. | |
| 2021/0226312 | A1* | 7/2021 | Guo | H01Q 1/38 |
| 2023/0044949 | A1* | 2/2023 | Park | H05K 5/0226 |
| 2023/0216202 | A1* | 7/2023 | Park | H01Q 21/28 343/893 |

FOREIGN PATENT DOCUMENTS

| | | | |
|---|---|---|---|
| KR | 10-1164618 | B1 | 7/2012 |
| KR | 10-1470914 | B1 | 12/2014 |
| KR | 10-2021-0001976 | A | 1/2021 |
| KR | 10-2021-0004054 | A | 1/2021 |

OTHER PUBLICATIONS

Communication issued Oct. 7, 2024 by the European Patent Office in European Patent Application No. 22856051.2.

* cited by examiner

MULTI-BAND ANTENNA AND ELECTRONIC DEVICE INCLUDING THE SAME

CROSS-REFERENCE TO RELATED APPLICATIONS

This application is a continuation of International Application No. PCT/KR2022/010658 designating the United States, filed on Jul. 21, 2022, in the Korean Intellectual Property Receiving Office and claiming priority to Korean Patent Application No. 10-2021-0105766, filed on Aug. 11, 2021, in the Korean Intellectual Property Office, the disclosures of which are incorporated by reference herein in their entireties.

BACKGROUND

1. Field

The disclosure relates to a multi-band antenna and an electronic device including the same and, more particularly, to an antenna operating on a dual band and an electronic device including the same.

2. Description of Related Art

For data transmission and reception, antennas of various types may be provided in electronic devices, improving user convenience. For example, an antenna for bidirectional communication such as commercial communication network access, wireless local area network (WLAN), and near-field communication (NFC), an antenna for broadcasting and a global navigation satellite system (GNSS), or an antenna for receiving wireless power may be provided in an electronic device.

SUMMARY

Provided are an antenna for generating polarization that operates on a plurality of bands and an electronic device including the same.

Additional aspects will be set forth in part in the description which follows and, in part, will be apparent from the description, or may be learned by practice of the presented embodiments.

According to an aspect of the disclosure, an electronic device includes: a housing, and an antenna provided in the housing, wherein the antenna includes: a first radiating layer including a first radiation patch, a slit formed in the first radiation patch, and a first feed point provided in the first radiation patch, a second radiating layer including a second radiation patch provided below the first radiation patch and a second feed point provided in the second radiation patch, a feeding layer including a coupling patch provided below the second radiation patch and at least one ground point provided in the coupling patch, a ground layer provided below the coupling patch, a feed line provided between the second radiation patch and the ground layer, the feed line including a third feed point, a signal via connecting the first feed point, the second feed point, and the third feed point, and a ground via connecting the at least one ground point and the ground layer.

The coupling patch may include a plurality of coupling sections configured to form a coupling pattern.

The plurality of coupling sections may include: a first section, and a second section provided opposite to the first section based on a first centerline of the feeding layer.

The plurality of coupling sections further may include: a third section provided opposite to the second section based on a second centerline of the feeding layer, the second centerline intersecting the first centerline, and a fourth section provided opposite to the third section based on the first centerline and opposite to the first section based on the second centerline.

The second radiation patch may include an edge, and the plurality of coupling sections may not overlap the edge of the second radiation patch.

Each of the plurality of coupling sections may include a plurality of subsections connected to each other or separated from each other.

Each of the plurality of coupling sections may include a plurality of subsections, and each of the subsections have a width and a length that less than the width.

The feeding layer may include a plurality of ground points arranged in a width direction of the plurality of coupling sections, the feeding layer may include a plurality of ground points respectively arranged in the width direction and a length direction of the plurality of coupling sections, or each of the plurality of coupling sections may include a plurality of subsections connected to each other, and the at least one ground point of the feeding layer is provided at a portion where the plurality of subsections are connected to each other.

The first radiation patch may include a plurality of first edges, the second radiation patch may include a plurality of second edges, the first radiation patch may include a first cut area between a pair of first edges adjacent to each other, and the second radiation patch may include a second cut area between a pair of second edges adjacent to each other.

The second radiating layer may further include an annular slot surrounding the second feed point.

According to an aspect of the disclosure, an electronic device includes: a housing, a printed circuit board (PCB) provided in the housing, an antenna assembly provided in the housing, and a cover coupled to the housing and covering the PCB and the antenna assembly, wherein the antenna assembly includes: a plurality of antennas, each of the plurality of antennas including: a first radiating layer including a first radiation patch, a slit formed in the first radiation patch, and a first feed point provided in the first radiation patch, a second radiating layer including a second radiation patch provided below the first radiation patch and a second feed point provided in the second radiation patch, and a feeding layer including a coupling patch provided below the second radiation patch and at least one ground point provided in the coupling patch, a ground layer provided below the feeding layer of each of the plurality of antennas, a plurality of feed lines each provided between the second radiating layer of each of the plurality of antennas and the ground layer, each of the plurality of feed lines including a third feed point, and a connector connecting the plurality of feed lines to the PCB.

The electronic device further includes a trace provided between a pair of feed lines adjacent to each other and configured to suppress signal interference between the pair of feed lines.

The ground layer may include an overlap area overlapping the plurality of antennas and formed in a mesh structure.

The ground layer may include: an antenna mount area in which the plurality of antennas are provided, and a wiring connection area in which at least a portion of the plurality of feed lines and the connector are provided, and the wiring connection area may include a bending area configured to be at least partially bent.

The electronic device may further include a fastening part provided between the PCB and the antenna assembly and configured to fasten the PCB and the antenna assembly to the housing.

The electronic device may further include a damage suppressor provided between the antenna assembly and the cover and configured to suppress damage to the cover caused by the antenna assembly.

The electronic device may further include an impact absorber provided between the cover and the connector and configured to prevent separation of the connector from the PCB.

The cover may include a plurality of radiation apertures respectively corresponding to the plurality of antennas.

The PCB and the antenna assembly may be stacked and mounted in the housing.

According to an aspect of the disclosure, an antenna includes: a first radiating layer including a first radiation patch, a slit formed in the first radiation patch, and a first feed point provided in the first radiation patch, a second radiating layer including a second radiation patch provided below the first radiation patch and a second feed point provided in the second radiation patch, a feeding layer including a coupling patch provided below the second radiation patch and at least one ground point provided in the coupling patch, a ground layer provided below the coupling patch, a feed line provided between the second radiation patch and the ground layer and including a third feed point, a signal via connecting the first feed point, the second feed point, and the third feed point, and a ground via connecting the at least one ground point and the ground layer.

According to one or more various embodiments, the size of an antenna may be reduced.

According to one or more various embodiments, all transmission-side polarized waves may be received irrespective of a transmission-side polarization angle and a reception-side polarization angle.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
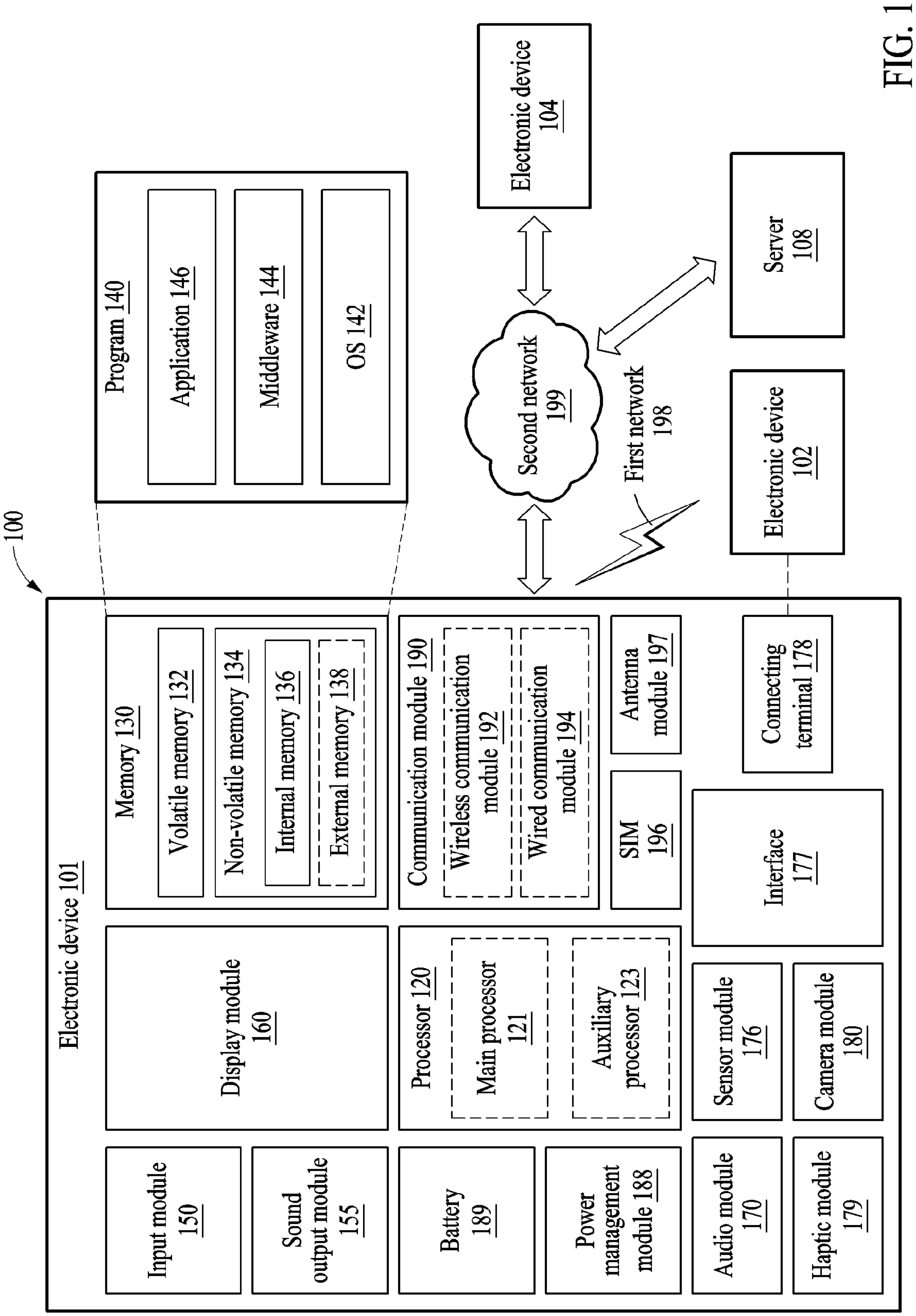
FIG. 1 is a block diagram of an electronic device in a network environment according to various embodiments.

FIG. 1 is a block diagram of an electronic device in a network environment according to various embodiments.

Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a portion of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a portion of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An AI model may be generated by machine learning. Such learning may be performed by, for example, the electronic device 101 in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a portion of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an embodiment, the display module 160 may include a touch sensor adapted to sense a touch, or a pressure sensor adapted to measure an intensity of a force incurred by the touch.

The audio module 170 may convert a sound into an electrical signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a portion of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a portion of the antenna module 197.

According to various embodiments, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least portion of the function or the service. The one or more external electronic devices receiving the request may perform the at least portion of the function or the service requested, or an additional function or an additional service related to the request, and may transfer an outcome of the performing to the electronic device 101. The electronic device 101 may provide the outcome, with or without further processing of the outcome, as at least portion of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic device may include, for example, a portable communication device (e.g., a smart phone), a computer device, a portable multimedia device, a portable medical device, a camera, a wearable device, or a home appliance device. According to an embodiment of the disclosure, the electronic device is not limited to those described above.

It should be appreciated that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C", each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least portion of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
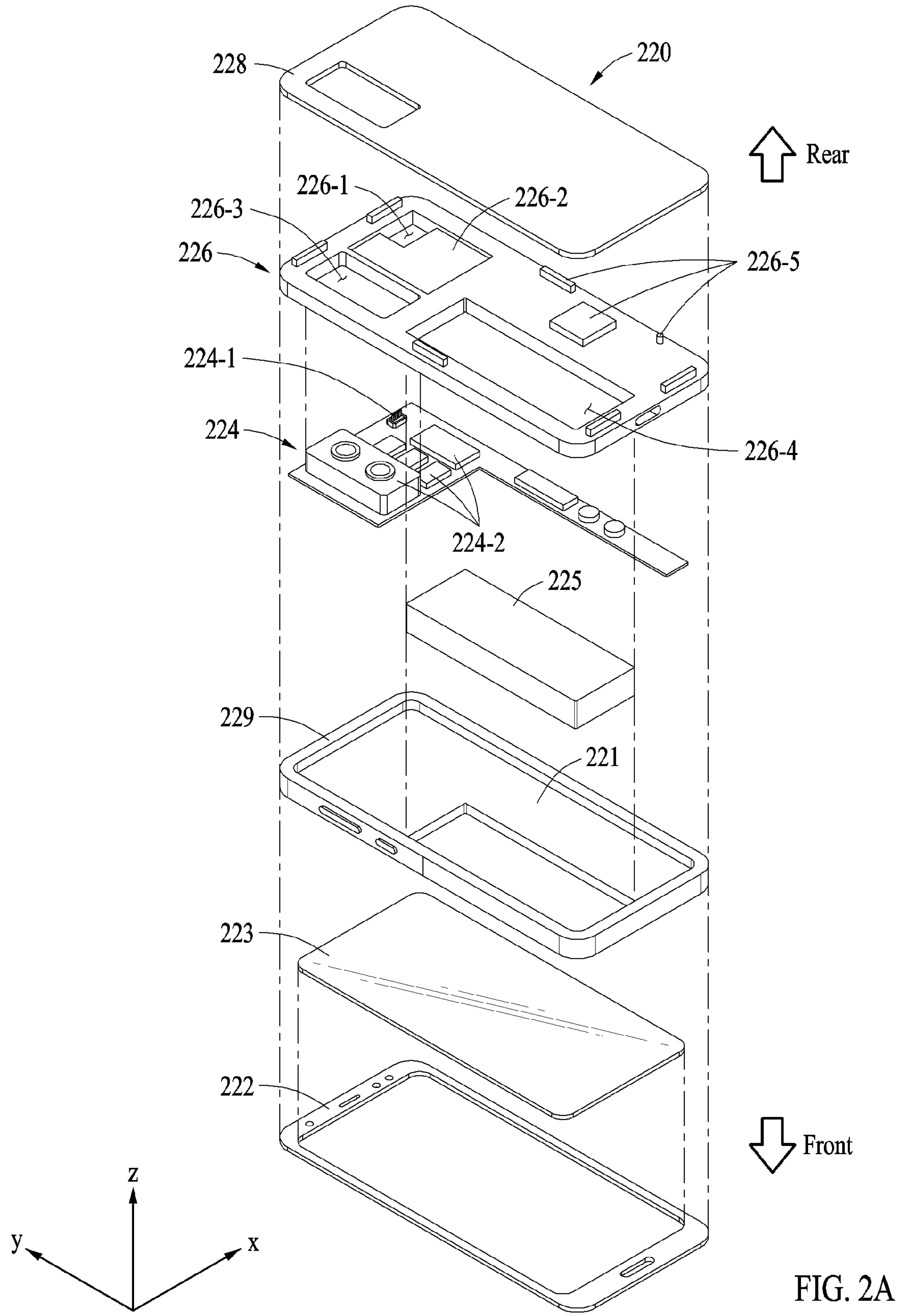
FIG. 2A is a diagram of an electronic device with an antenna omitted according to various embodiments.
Figure 2B:
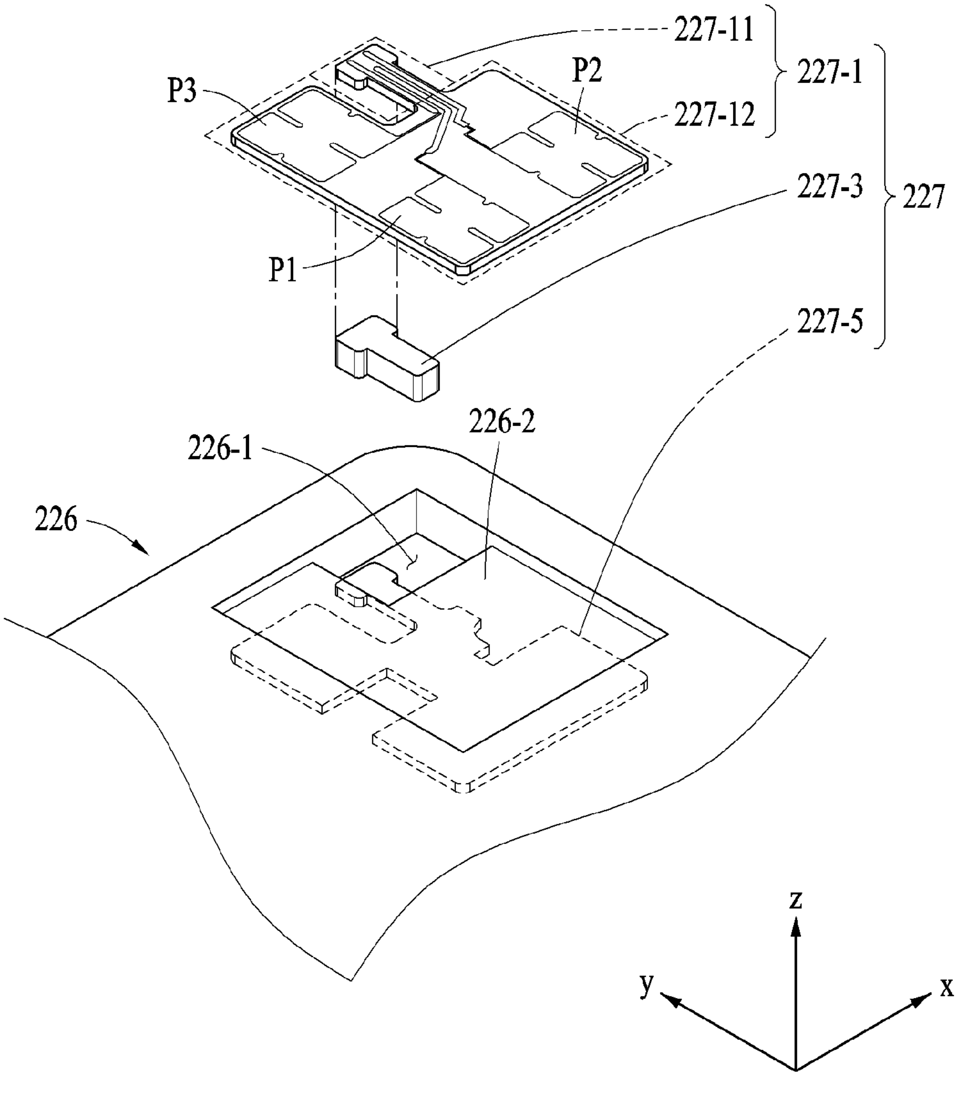
FIG. 2B is a diagram of a seating portion of a rear frame and an antenna according to various embodiments.
Figure 2C:
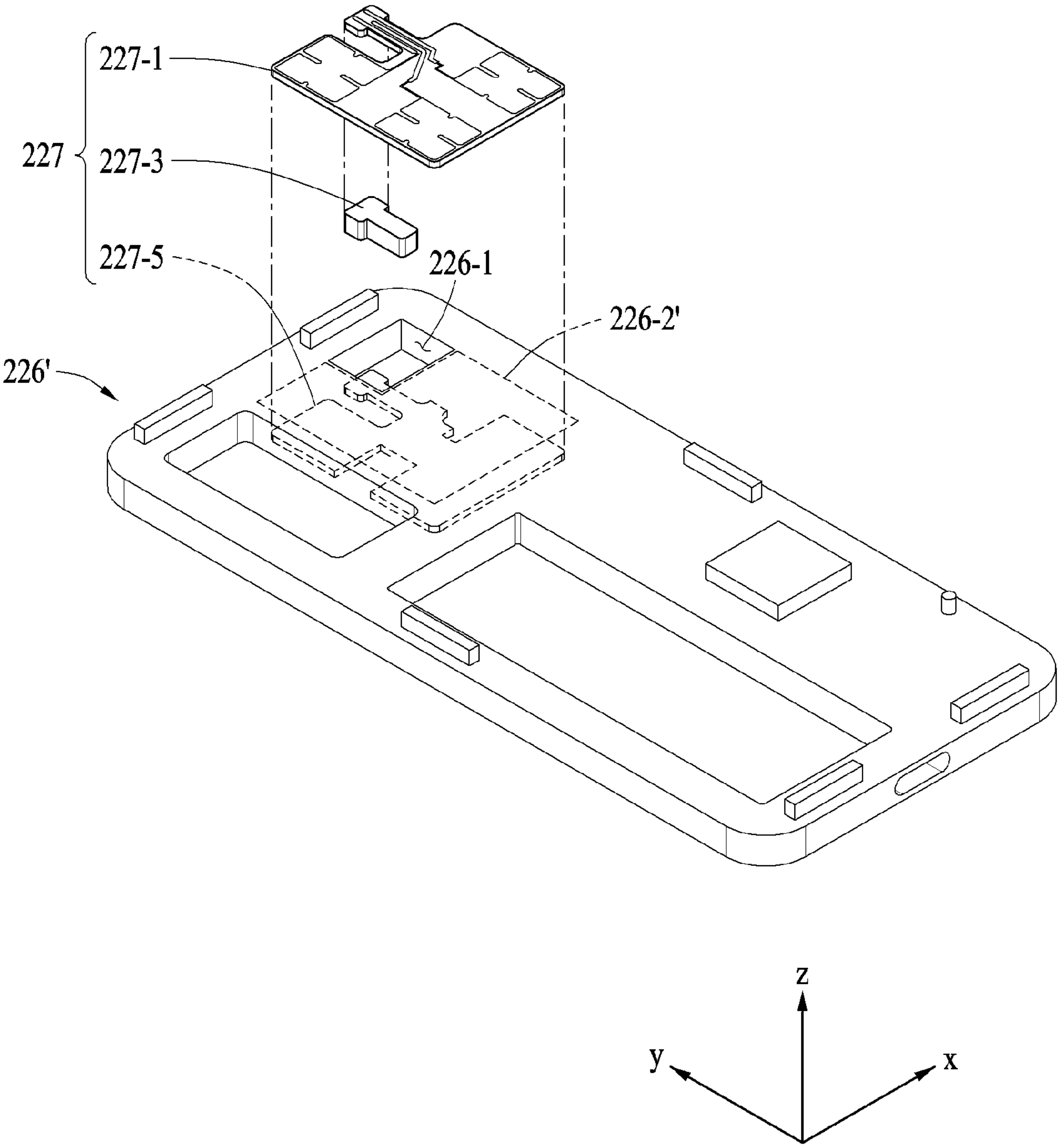
FIG. 2C is a diagram of a rear frame and an antenna according to various embodiments.

FIG. 2A is a diagram of an electronic device with an antenna omitted according to various embodiments. FIG. 2B is a diagram of a seating portion of a rear frame and an antenna according to various embodiments. FIG. 2C is a diagram of a rear frame and an antenna according to various embodiments.

Referring to FIGS. 2A through 2C, an electronic device 220 (e.g., the electronic device 101 of FIG. 1) may include housings 222, 228, and 229, one or more support structures 221, 224, and 226, a display 223, a battery 225, and an antenna 227.

The housings 222, 228, and 229 may form an exterior of the electronic device 220. The housings 222, 228, and 229 may include a front housing 222 (e.g., a front cover glass) surrounding a front outer surface of the electronic device 220, a side housing 229 (e.g., a bezel frame) surrounding a lateral edge of the electronic device 220, and a rear housing 228 (e.g., a rear cover glass) surrounding a rear outer surface of the electronic device 220.

Although the housings 222, 228, and 229 are illustrated in FIG. 2A as being divided into three parts that cover the front, side, and rear, respectively, examples of which are not limited to the illustrated example. For example, the side housing 229 may be provided as an integral form with the front housing 222 or the rear housing 228. Alternatively, the front housing 222 and the rear housing 228 may be coupled to each other without a separate side housing (e.g., the side housing 229) to form the entire exterior of the electronic device 220. Alternatively, the housings 222, 228, and 229 may be formed in different directions and numbers, for example, as two housings divided into upper and lower portions. Unless otherwise stated, the front, side, and rear merely refer to portions in which the respective housings 222, 228, and 229 are disposed with respect to the electronic device 220, and a detailed description thereof will be omitted.

The rear housing 228 may be in a structure that surrounds the rear outer surface of the electronic device 220 such that a radiating portion 227-1 of the antenna 227 is not directly exposed to the outside, and may thus prevent or reduce potential damage to the radiating portion 227-1 by an external impact. For example, a portion of the rear housing 228 that overlaps the radiating portion 227-1 in a front-rear direction (e.g., a z-axis direction) may be formed of a material that is not a conductor, and may thus reduce a loss of a gain of radio waves transmitted from the radiating portion 227-1. According to various embodiments, the overlapping portion may be understood as an overlapping portion when viewed from one direction.

The support structures 221, 224, and 226 may be disposed inside the housings 222, 228, and 229, and support at least one of the electronic components 223, 224, and 225 accommodated in the electronic device 220.

The radiating portion 227-1 and a ground portion 227-5 of the antenna 227 may be disposed on both sides of the support structures 221, 224, and 226, respectively. This structure may enable the utilization, as a substrate of the antenna 227, the support structures 221, 224, and 226 that are present to perform required functions in the electronic device 220, and may thus improve the efficiency of a mounting space. In addition, in general, the support structures 221, 224, and 226 have a sufficient thickness to secure rigidity of the electronic device 220, and the thickness of the substrate of the antenna 227 may also be improved, thereby improving the radiation efficiency of the antenna 227.

For example, the support structures 221, 224, and 226 may include a first frame 221 (e.g., a front frame) for supporting the display 223, a PCB 224, and a second frame 226 (e.g., a rear frame). Although the support structures 221, 224, and 226 are described as including two frames 221 and 226, any one of these frames may be omitted, or an additional frame may be further provided. When a direction crossing the front and rear surfaces of the electronic device 220 is referred to as a "front-rear direction", a structure (e.g., the structure 221) disposed at a foremost side among the support structures 221, 224, and 226 may be referred to as a "front frame" with respect to the front-rear direction, and a structure (e.g., the structure 226) disposed at a rearmost side among the support structures 221, 224, and 226 may be referred to as a "rear frame" with respect to the front-rear direction. However, for example, when the support structures 221, 224, and 226 include one frame, the one frame may be referred to as a "rear frame" in that it is disposed behind the display 223.

Hereinafter, a case in which the antenna 227 is installed in the rear frame 226 will be described as an example. Unless otherwise stated, it should be understood herein that the antenna 227 may also be installed in other support structures 221 and 224, not in the rear frame 226, and a detailed description thereof will be omitted.

The display 223 may output visual information (e.g., a text, a video, and/or an image) and provide the visual information to a user through the front housing 222.

The front frame 221 may support the display 223 from the rear of the front housing 222 toward the front housing 222. For example, the rigidity of the front frame 221 may be higher than that of the housings 222, 228, and 229. This structure may reduce an overall deformation of the electronic device 220 by using the front frame 221 while facilitating a relatively free selection of a material of the housings 222, 228, and 229. For example, as illustrated in FIG. 2A, the front frame 221 may be in a structure connected to the side housing 229. For example, the front frame 221 and the side housing 229 may be integrally formed, but are not necessarily limited thereto. It may also be understood by those skilled in the art that the front frame 221 and the side housing 229 are provided as separate members.

The front frame 221 may be formed of, for example, a metal material and/or a non-metal material (e.g., polymer). The display 223 may be coupled to a front surface of the front frame 221, and the PCB 224 may be coupled to a rear surface of the front frame 221.

On the PCB 224, one or more components (e.g., a processor, a memory, and/or an interface) may be mounted. The processor may include, for example, one or more of a central processing unit, an application processor, a graphics processing unit, an image signal processor, a sensor hub processor, and a communication processor. On the PCB 224, a board connector 224-1 for transmitting or receiving a signal to or from the antenna 227 and various electronic components 224-2 (e.g., a camera module) may be mounted.

The battery 225 may supply power to one or more components (e.g., the display 223, the PCB 224, and/or the antenna 227). For example, at least a portion of the battery 225 may be disposed on substantially the same plane as the PCB 224. The battery 225 may be disposed integrally inside the electronic device 220, or disposed detachably from the electronic device 220.

The rear frame 226 may be disposed behind the front frame 221. For example, electronic components may be fastened to the rear frame 226. For example, the rear frame 226 may be formed by injection molding. The rear frame 226 may also be referred to as a "rear injection mold." For example, the rigidity of the rear frame 226 may be higher than the rigidity of the housings 222, 228, and 229. The rear frame 226 may form a space in which at least one electronic component (e.g., the board connector 224-1) is disposed, between the front frame 221 and the rear frame 226, together with the front frame 221. For example, a portion of the front frame 221 and a portion of the rear frame 226 may be in direct contact to form a space between the front frame 221 and the rear frame 226. For example, the rigidity of each of the front frame 221 and the rear frame 226 may be higher than that of the PCB 224, and the PCB 224 may be disposed between the front frame 221 and the rear frame 226. Such a rigid space may prevent or reduce transmission of an external impact to the PCB 224 that is relatively flexible, and may thus prevent or reduce damage to the various electronic components 224-1 inside the electronic device 220. For example, the rear frame 226 may be formed of a dielectric, and thus at least a portion of the rear frame 226 may be used as a substrate of the antenna 227. The rear frame 226 may include a seating portion 226-2, a connecting hole 226-1, a through portion 226-3, a recessed portion 226-4, and a protruding portion 226-5.

The through portion 226-3, the recessed portion 226-4, and the protruding portion 226-5 may be structures provided to support or receive various electronic components or structures to be accommodated in the electronic device 220. For example, the one or more electronic components 224-2 (e.g., a camera module) installed on the PCB 224 may pass through the through portion 226-3 to be exposed to the rear housing 228. For example, the recessed portion 226-4 may provide a space in which an electronic component (e.g., an antenna) mounted on an inner wall of the rear housing 228 is accommodated. For example, the protruding portion 226-5 may be of a shape that is tightly fit into a groove formed in the rear housing 228, thereby allowing the rear frame 226 and the rear housing 228 to be coupled to each other. For example, the protruding portion 226-5 and/or the recessed portion 226-4 may be formed on the front surface, in addition to the rear surface of the rear frame 226 as illustrated. The protruding portion 226-5 and/or the recessed portion 226-4 may support other components (e.g., the PCB 224, the battery 225, and/or the rear housing 228) adjacent to the front and/or rear surfaces of the rear frame 226 to prevent or reduce relative movements of the other components with respect to the rear frame 226. For example, the protruding portion 226-5 may be formed to function as a reinforcing rib for reinforcing the rigidity of the rear frame 226 itself, not for interfering with the other components. As described above, the rear frame 226 may not have a simple planar shape, but may have the protruding portion 226-5, the recessed portion 226-4, and/or the through portion 226-3 that perform various functions.

Unlike this, the seating portion 226-2 on which the antenna 227 is seated, which is as an area of the rear frame 226, may have, for example, a generally flat shape. For example, of the seating portion 226-2, an area overlapping the radiating portion 227-1 of the antenna 227 in the front-rear direction may be flat. Such a shape may allow the thickness of the seating portion 226-2 functioning as a dielectric to be constant as described below, thereby improving the easiness of designing a pattern of the antenna 227.

The seating portion 226-2 may be a portion that is disposed between the radiating portion 227-1 and the ground portion 227-5 of the antenna 227, and be formed of a dielectric material, which is a material causing an electrical induction action, and thereby function as a substrate of the antenna 227. For example, the seating portion 226-2 may be formed of (i) polycarbonate or (ii) a synthetic material (e.g., PC+GF30%) including polycarbonate and glass fiber. In addition to the seating portion 226-2, the rear frame 226 may be formed of the same dielectric material. This structure may enable injection molding of the rear frame 226 including the seating portion 226-2 integrally, and improve the easiness of manufacturing.

For example, as illustrated in FIG. 2B, the seating portion 226-2 may have a shape that is recessed from an adjacent area of the rear frame 226, but is not necessarily limited thereto. For example, as illustrated in FIG. 2C, a seating portion 226-2' may not have a stepped portion with respect to an adjacent area of a rear frame 226'.

The connecting hole 226-1 may be disposed adjacent to the seating portion 226-2 and may pass through the rear frame 226 in the front-rear direction. Such a structure may allow the antenna 227 to be physically and electrically connected to the PCB 224 through the connecting hole 226-1, thereby feeding power from the PCB 224 to the antenna 227. For example, the connecting hole 226-1 may be disposed within 1 centimeter (cm) from the seating portion 226-2. For example, a step (e.g., stair) or a slope may be disposed between the connecting hole 226-1 and the seating portion 226-2.

Although the connecting hole 226-1 is illustrated as being formed inside the rear frame 226, the connecting hole 226-1 may have a shape recessed from a side surface of the rear frame 226. For example, the rear frame 226 may further include a cut portion that communicates with the outside in a lateral direction of the connecting hole 226-1. Such a structure may enable an installation of the antenna 227 in the rear frame 226 using a manufacturing method to be described later with reference to FIG. 5B.

For example, at least a portion of the outer surface of a dielectric 227-3 of the antenna 227 may be disposed to face the inner wall of the connecting hole 226-1. For example, some of exposed surfaces of the dielectric 227-3 that are not covered by the radiating portion 227-1 and the ground portion 227-5 may be disposed to face the inner walls of the connecting hole 226-1. For example, the exposed surfaces described above may be in face-to-face contact with the inner walls of the connecting hole 226-1. For example, the dielectric 227-3 may be closely attached to an inner surface of the connecting hole 226-1 such that there is no gap between an outer surface of the dielectric 227-3 and the inner surface of the connecting hole 226-1. However, a fine gap may be generated between the outer surface of the dielectric 227-3 and the inner surface of the connecting hole 226-1 in a manufacturing process. For another example, the connecting hole 226-1 may be formed in a shape different from that illustrated in FIGS. 2A and 2B, for example, a triangle, a pentagon, a hexagon, a circle, and/or an oval. For example, at least a portion of the outer surface of the dielectric 227-3 of the antenna 227 may be disposed to face the inner wall of the connecting hole 226-1.

According to an embodiment, the dielectric 227-3 of the antenna 227 may include polyimide. For example, the dielectric 227-3 of the antenna 227 may include modified polyimide (MPI).

The antenna 227 may be disposed between the rear housing 228 and the battery 225, for example. The antenna 227 may include, for example, an ultra-wide band (UWB) antenna, a magnetic secure transmission (MST) antenna 297-1, a NFC antenna 297-3, and/or a wireless charging antenna 297-5. The antenna 227 may, for example, perform long-range or short-range communication with an external device, or wirelessly transmit and receive power required for charging. Hereinafter, the antenna 227 will be described as a UWB antenna as an example. However, unless otherwise stated, the following description is also applicable to other types of antennas. The UWB antenna may be an antenna having a high level of positioning accuracy with an error range of 10 cm or less by using a high frequency (2.1 to 10.6 gigahertz (GHz)) and having security enhanced through a time of flight (ToF) method using a wide bandwidth of 500 megahertz (MHz). The UWB antenna may be used for, for example, access technology (e.g., security, car keys, and/or digital keys), location based services (LBS) (e.g., indoor navigation), people/asset tracking technology, mobile payment, and internet of things (IoT) devices. The positioning method using the UWB antenna may include, for example, a ToF measurement method, a time of arrival (ToA) measurement method, and/or an angle of arrival (AoA) measurement method. Although a case in which the antenna 227 uses the AoA measurement method will be described below as an example, another measurement method may also be used unless otherwise stated.

The antenna 227 may include the radiating portion 227-1 and the ground portion 227-5 respectively disposed on both surfaces of the rear frame 226, and the dielectric 227-3 disposed between the radiating portion 227-1 and the ground portion 227-5.

The radiating portion 227-1 may be disposed on a rear surface of the seating portion 226-2, and the ground portion 227-5 may be disposed on a front surface of the seating portion 226-2. For example, the antenna 227 may be disposed on the rear frame 226, not on the other support structures 221 and 224, and the radiating portion 227-1 may be disposed on the rear surface of the rear frame 226. Such a structure may prevent or reduce interference in a signal emitted from the radiating portion 227-1 by an internal component (e.g., the display 223, the board connector 224-1, and/or the electronic component 224-2) including various conductive materials, thereby improving the radiation efficiency. Conversely, as illustrated in FIG. 2A, a component having a conductive material, for example, the electronic component 224-2, may be disposed in an area that overlaps the antenna 227 in the front-rear direction and is disposed opposite to the radiating portion 227-1. Thus, such a structure may improve a degree of freedom in designing internal components of the electronic device 220.

As illustrated in FIG. 2B, a first portion 227-11 of the radiating portion 227-1 may cover the dielectric 227-3, and a second portion 227-12 of the radiating portion 227-1 may cover a portion (e.g., the seating portion 226-2) of the rear frame 226. Similarly, a first portion of the ground portion 227-5 may cover the dielectric 227-3, and a second portion of the ground portion 227-5 may cover a portion (e.g., the seating portion 226-2) of the rear frame 226. Such a structure may not require a dielectric disposed on the rear surface of the rear frame 226, and may thus considerably reduce the overall thickness of the antenna 227 by the thickness of the dielectric. For example, it is also possible to considerably reduce the thickness of the electronic device 220 of a foldable type, the electronic device 220 of a rollable type, and/or the electronic device 220 of a slidable type, in addition to the electronic device 220 of a bar type that is illustrated herein as an example.

The radiating portion 227-1 may include a plurality of patch plates P1, P2, and P3 each being in the form of a patch. Using the patch plates P1, P2, and P3, a direction in which an electromagnetic source is positioned may be detected. For example, the direction in which the electromagnetic source is positioned may be detected by comparing magnitudes of signals received using the patch plates P1, P2, and P3 or by comparing phases of the signals received using the patch plates P1, P2, and P3. For example, through an AoA detecting method based on a phase difference between the signals received using the patch plates P1, P2, and P3, it is possible to detect the direction of the electromagnetic source with a high resolution compared to the former method of comparing the magnitudes.

The patch plates P1, P2, and P3 may include, for example, three patch plates P1, P2, and P3 that are not positioned on a straight line. By the three patch plates P1, P2, and P3, both two components—a horizontally polarized wave which is a radio wave vibrating in a horizontal direction with respect to a traveling direction, and a vertically polarized wave which is a radio wave vibrating in a vertical direction with respect to the traveling direction—may be verified. Thus, by detecting the AoA, the antenna 227 may function as a UWB antenna that detects a direction of an electromagnetic source with a high resolution.

For example, the three patch plates P1, P2, and P3 may include (i) a first patch plate P1 in the form of a patch disposed on the rear surface of the rear frame 226, (ii) a second patch plate P2 in the form of a patch that is spaced apart from the first patch plate P1 in a first direction (e.g., a +x-axis direction) on the rear surface of the rear frame 226, and (iii) a third patch plate P3 in the form of a patch that is spaced apart from the first patch plate P1 in a second direction (e.g., a +y-axis direction) on the rear surface of the rear frame 226. In this example, the first patch plate P1, the second patch plate P2, and the third patch plate P3 may be installed such that their centers are not positioned on a straight line, and it is thus possible to verify the two components—the horizontally polarized wave and the vertically polarized wave. For example, the first direction (e.g., the +x-axis direction) and the second direction (e.g., the +y-axis direction) may be orthogonal to each other on the rear surface of the rear frame 226. For example, an angle formed between a first imaginary line connecting the center of the first patch plate P1 and the center of the second patch plate P2 and a second imaginary line connecting the center of the first patch plate P1 and the center of the third patch plate P3 may be about 45 degrees to about 135 degrees. For example, the angle formed between the first imaginary line and the second imaginary line may be about 90 degrees. That is, the three patch plates P1, P2, and P3 may be disposed at positions corresponding to vertices of a right-angled triangle, on the rear surface of the rear frame 226. Such a structure may improve a detection function of the UWB antenna 227. Unless otherwise stated, the antenna 227 may include two or fewer patch plates, or include four or more patch plates.

As illustrated in FIGS. 2A and 2B, the dielectric 227-3 may be positioned in a portion overlapping the board connector 224-1 when viewed in the front-rear direction. According to an embodiment, when viewed in the front-rear direction, the dielectric 227-3 may be disposed at a position (i) that is spaced apart from the second patch plate P2 in the second direction (e.g., the +y-axis direction) and (ii) that is spaced apart from the third patch plate P3 in the first direction (e.g., the +x-axis direction). By such a shape, the three patch plates P1, P2, and P3 and the dielectric 227-3 may roughly form an overall rectangular shape when viewed from the front-rear direction.

Figure 3A:
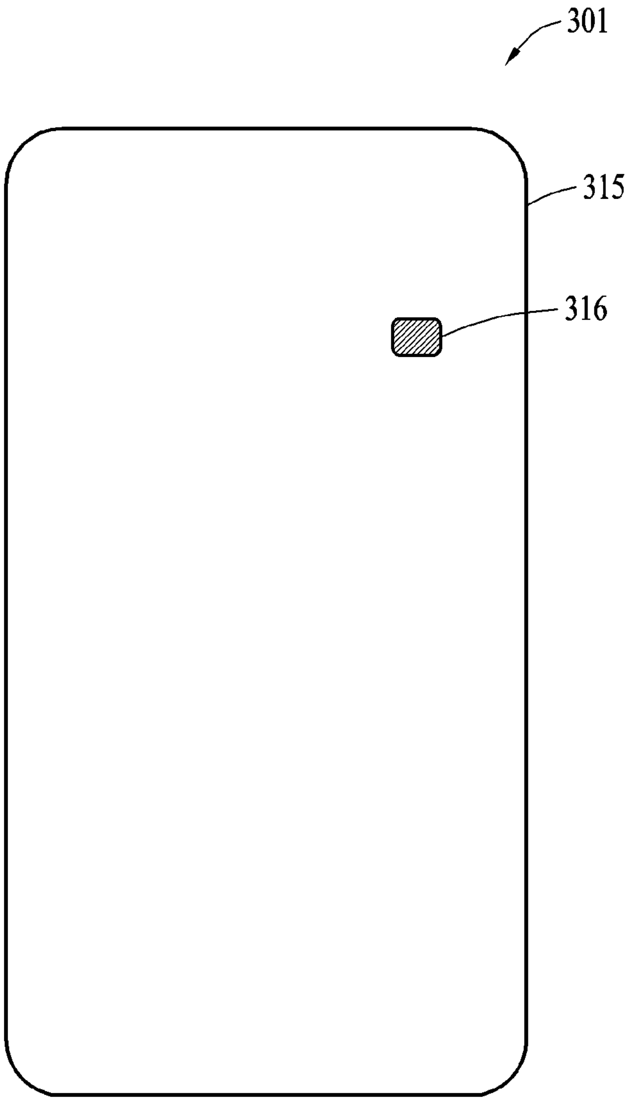
FIG. 3A is a diagram of a cover of an electronic device according to an embodiment.
Figure 3B:
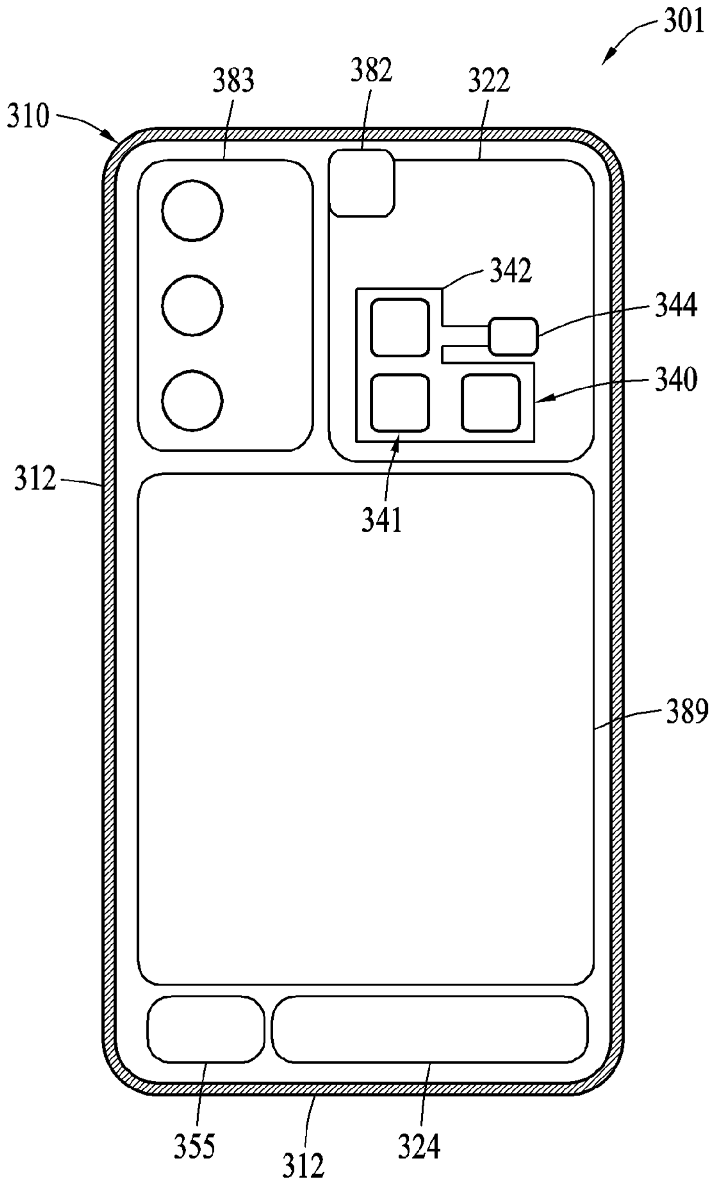
FIG. 3B is a diagram of the electronic device of FIG. 2A without a cover according to an embodiment.
Figure 3C:
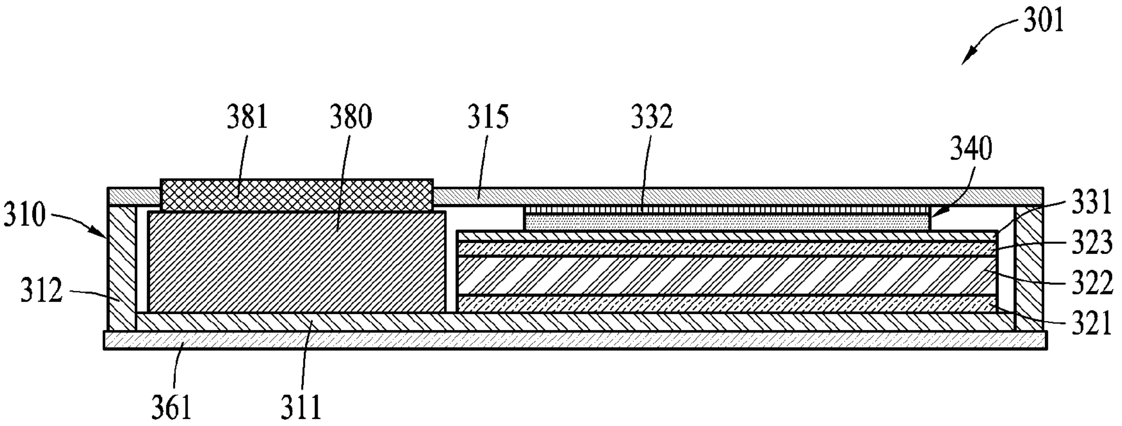
FIG. 3C is a diagram of an electronic device according to an embodiment.
Figure 3D:
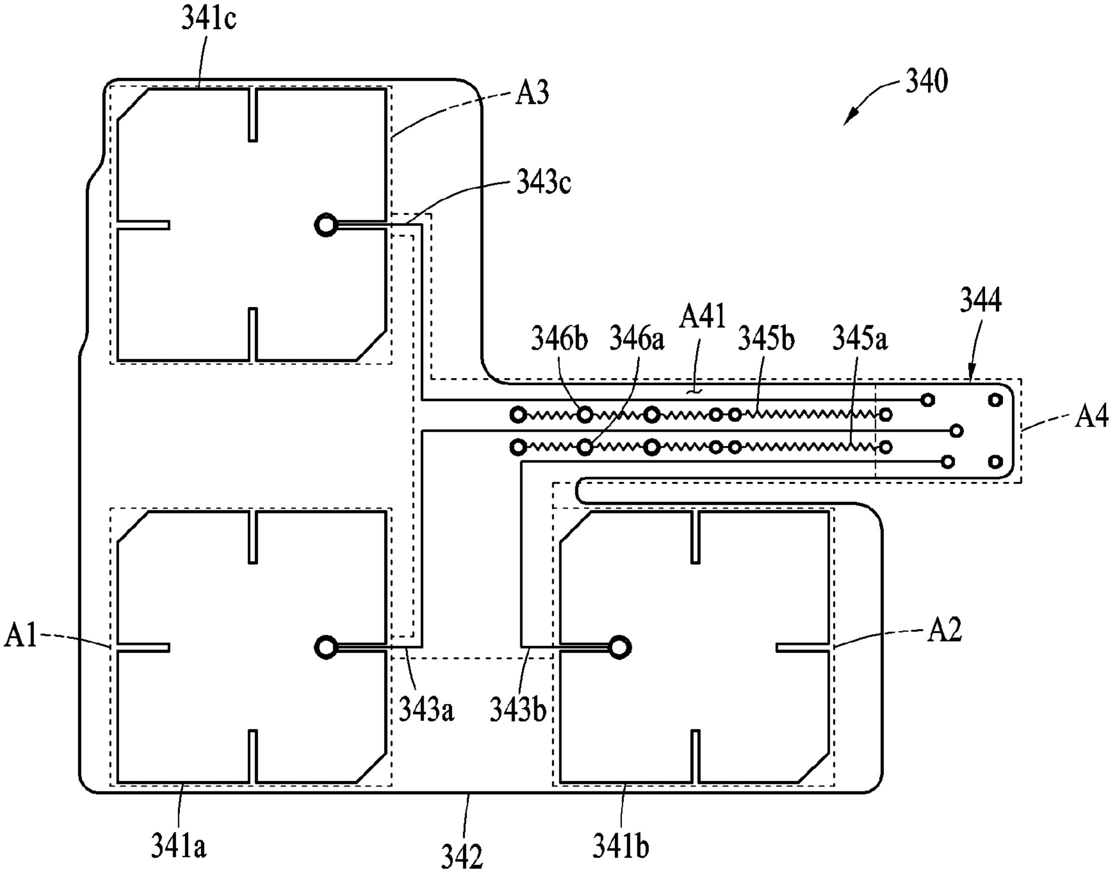
FIG. 3D is a diagram of an antenna assembly according to an embodiment.

FIG. 3A is a diagram of a cover of an electronic device according to an embodiment. FIG. 3B is a diagram of the electronic device of FIG. 2A without a cover according to an embodiment. FIG. 3C is a diagram of an electronic device according to an embodiment. FIG. 3D is a diagram of an antenna assembly according to an embodiment.

Referring to FIGS. 3A to 3D, an electronic device 301 (e.g., the electronic device 220 of FIGS. 2A to 2C) according to an embodiment may include a housing 310 including a first surface 211 (e.g., a front surface, the front housing 222) and a plurality of second surfaces 212 (e.g., side surfaces, the side housing 229), a display 361 (e.g., the display 223) positioned on the first surface 311, and a cover 315 (e.g., the rear housing 228) positioned opposite to the first surface 311 and coupled to the plurality of second surfaces 312. In an embodiment, the cover 315 may be formed of at least one material of glass and polycarbonate.

The electronic device 301 may include a camera module 380 (e.g., the camera module 180 of FIG. 1 and/or the electronic component 224-2 of FIG. 2A) positioned in a first portion (e.g., an upper portion) of the housing 310, and a camera exterior portion 381 that forms the exterior of the camera module 380 and is coupled to the cover 315. In an embodiment, the camera module 380 may include a first camera module 382 (e.g., a front camera module) positioned on the first surface 311, and a second camera module 383 (e.g., a rear camera module) positioned opposite the first surface 311. The electronic device 301 may include a first PCB 321, a second PCB 323, and an interposer circuit board or interposer 322 between the first PCB 321 and the second PCB 323, which are positioned in the first portion (e.g., the upper portion) of the housing 310 and stacked in one direction (e.g., a thickness direction of the electronic device 301). In an embodiment, the first PCB 321, the second PCB 323, and the interposer 322 may be stacked on the first surface 311 and between the first surface 311 and the cover 315. The electronic device 301 may include a battery module 389 (e.g., the battery module 189) positioned in a second portion (e.g., a middle portion) of the housing 310. The electronic device 301 may include a sound output module 355 (e.g., the sound output module 155) and a third PCB 324 positioned in a third portion (e.g., a lower portion) of the housing 310.

The electronic device 301 may include an antenna assembly 340 (e.g., the antenna 227) positioned in the first portion (e.g., the upper portion) of the housing 310. The antenna assembly 340 may be positioned on the interposer 322 interposed between the first PCB 321 and the second PCB 323. The antenna assembly 340 may be positioned next to the second camera module 383.

In an embodiment, the antenna assembly 340 may include a plurality of antennas 341 including a first antenna 341*a* (e.g., the first patch plate P1), a second antenna 341*b* (e.g., the second patch plate P2), and a third antenna 341*c* (e.g., the third patch plate P3), a ground layer 342, a first feed line 343*a*, a second feed line 343*b*, a third feed line 343*c*, and a connector 344 (e.g., the first portion 227-11 of the radiating portion 227-1).

The plurality of antennas 341 may be positioned to substantially intersect with (e.g., to be orthogonal to) each other on the ground layer 342. For example, the second antenna 341*b* may be positioned in a first direction (e.g., a lateral direction) based on the first antenna 341*a*, and the third antenna 341*c* may be positioned in a second direction (e.g., a longitudinal direction) that intersects with (e.g., is orthogonal to) the first direction of the first antenna 341*a*. In an embodiment, a distance between the first antenna 341*a* and the second antenna 341*b* and/or a distance between the first antenna 341*a* and the third antenna 341*c* may be about 14 mm to about 20 mm. An arrangement structure of the plurality of antennas 341 may allow positioning of a reception angle of a signal received in an elevation direction and/or an azimuth direction. The first feed line 343*a*, the second feed line 343*b*, and the third feed line 343*c* respectively connected to the first antenna 341*a*, the second antenna 341*b*, and the third antenna 341*c* may extend to the connector 344 (e.g., a pin) and be connected to the interposer 323. In an embodiment, the first feed line 343*a*, the second feed line 343*b*, and the third feed line 343*c* may have an impedance of about 50 ohms.

The ground layer 342 may include a first antenna mount area A1 in which the first antenna 341*a* is mounted, a second antenna mount area A2 in which the second antenna 342*b* is mounted, a third antenna mount area A3 in which the third antenna 342*c* is mounted, and a wiring connection area A4 in which the first feed line 343*a*, the second feed line 343*b*, and the third feed line 343*a* are mounted. In an embodiment, the first antenna mount area A1 may have a first overlap area overlapping the first antenna 341*a*, the second antenna mount area A2 may have a second overlap area overlapping the second antenna 341*b*, and the third antenna mount area A3 may have a third overlap area overlapping the third antenna 341*c*. In an embodiment, at least one of the first overlap area, the second overlap area, and the third overlap area may be formed in a mesh structure. In an embodiment, at least a portion of the wiring connection area A4 may include a bending portion A41 configured to be flexibly bent. In some embodiments, the bending portion A41 may be formed in a mesh structure.

In an embodiment, the antenna assembly 340 may include a first trace 345*a* positioned between the first feed line 343*a* and the second feed line 343*b*, and a second trace 345*b* positioned between the second feed line 343*b* and the third feed line 343*c*. Since the bending portion A41 has a relatively smaller area than at least one of the first antenna mount area A1, the second antenna mount area A2, and the third antenna mount area A3, the mutual intervals among the first feed line 343*a*, the second feed line 343*b*, and the third feed line 343*c* positioned in the bending portion A41 may be narrowed. Thus, the first trace 345*a* may be configured to reduce an influence (e.g., signal interference) between the first feed line 343*a* and the second feed line 343*b* positioned in the bending portion A41, and the second trace 345*b* may be configured to reduce an influence (e.g., signal interference) between the second feed line 343*b* and the third feed line 343*c* positioned in the bending portion A41. The first trace 345*a* and the second trace 345*b* may be positioned on substantially the same layer as the layer on which the first feed line 343*a*, the second feed line 343*b*, and the third feed line 343*c* are positioned. The first trace 345*a* and the second trace 345*b* may be connected to the ground layer 342 through at least one first ground via 346*a* and at least one second ground via 346*b*, respectively.

In an embodiment, the electronic device 301 may include a fastening part 331 positioned between the antenna assembly 340 and the interposer 323. The fastening part 331 may be configured to fasten the interposer 323 to the housing 310, and may allow the antenna assembly 340 to be stably mounted on the interposer 323. In an embodiment, the fastening part 331 may include a screw structure, a hook structure, and other fastening mechanisms. In an embodiment, the fastening part 331 may be formed of at least one material of polycarbonate and a metal material.

In an embodiment, the electronic device 301 may include a damage suppressor 332 positioned between the antenna assembly 340 and the cover 315. The damage suppressor 332 may prevent the cover 315 from being scratched by an edge of the antenna assembly 340 when the cover 315 is assembled to the housing 310, and prevent a sag caused by the friction between the antenna assembly 340 and the cover 315. In an embodiment, the damage suppressor 332 may be a thin film. In an embodiment, the damage suppressor 332 may be formed of an elastic material (e.g., a sponge).

In an embodiment, the electronic device 301 may include an impact absorber 316 positioned between the connector 344 and the cover 315. The impact absorber 316 may be configured to press the connector 344. The impact absorber 316 may prevent the connector 344 from being separated from the interposer 323 by other external impacts such as an impact applied to the electronic device 301 when the electronic device 301 is dropped. In an embodiment, the impact absorber 316 may be formed of an elastic material (e.g., a sponge).

Figure 4A:
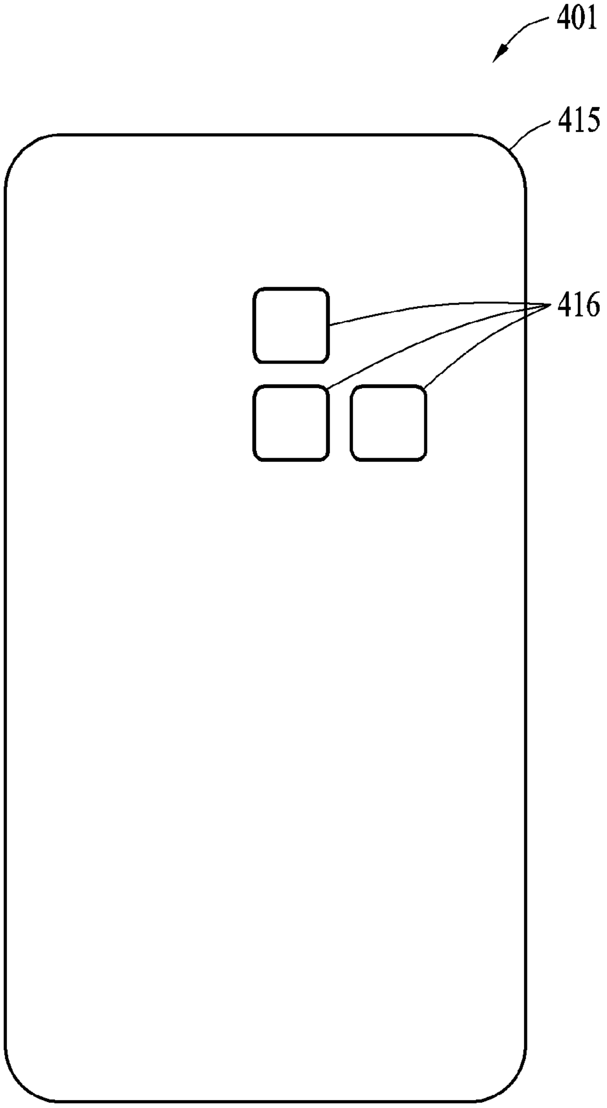
FIG. 4A is a diagram of a cover of an electronic device according to an embodiment.
Figure 4B:
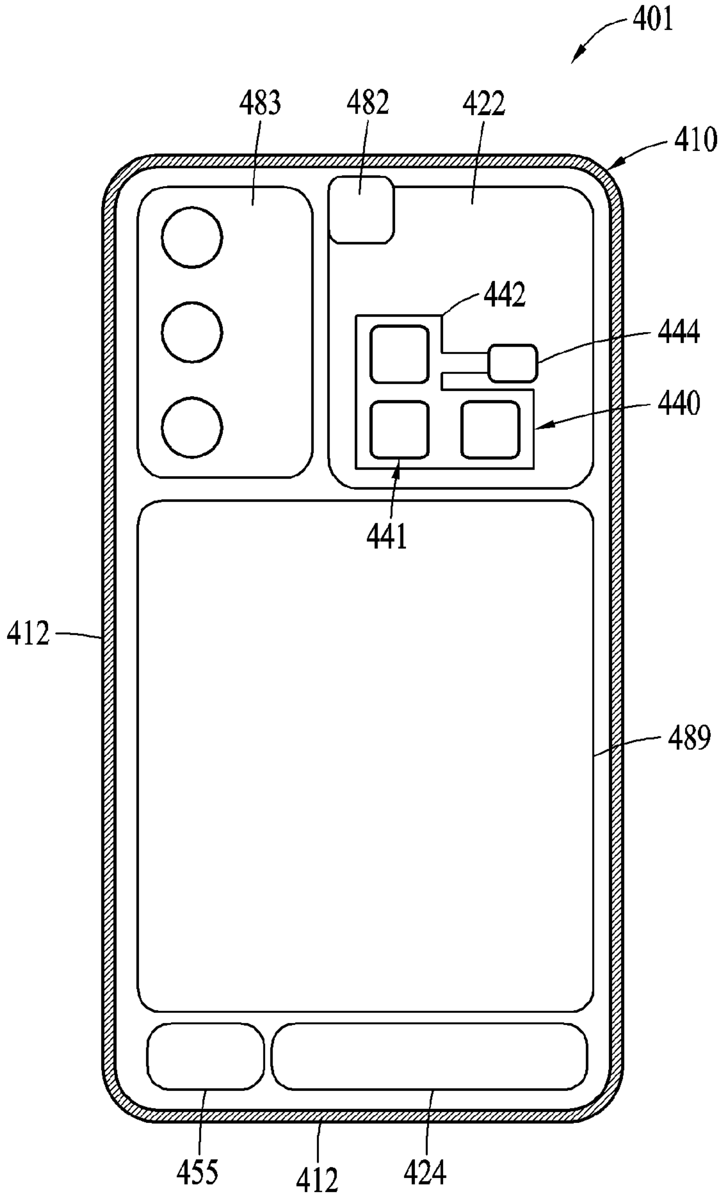
FIG. 4B is a diagram of the electronic device of FIG. 3A without a cover according to an embodiment.
Figure 4C:
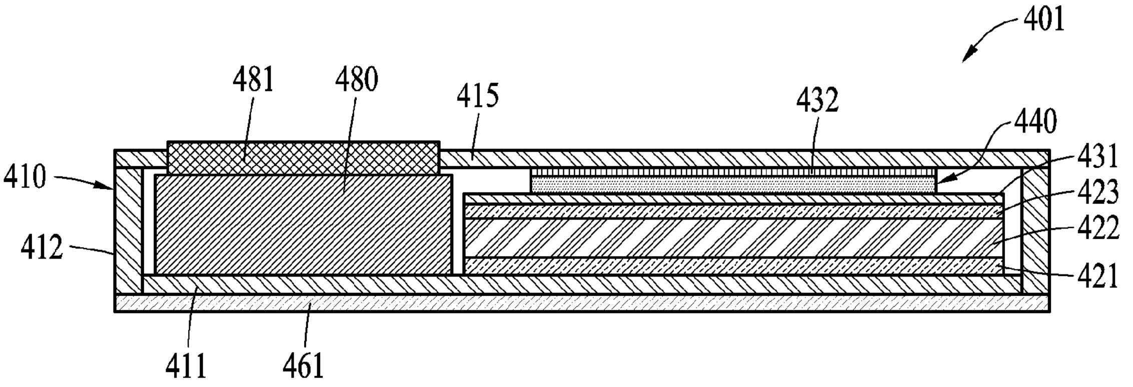
FIG. 4C is a diagram of an electronic device according to an embodiment.

FIG. 4A is a diagram of a cover of an electronic device according to an embodiment. FIG. 4B is a diagram of the electronic device of FIG. 3A without a cover according to an embodiment. FIG. 4C is a diagram of an electronic device according to an embodiment.

Referring to FIGS. 4A to 4C, an electronic device 401 (e.g., the electronic device 301) according to an embodiment may include a housing 410 (e.g., the housing 310) including a first surface 411 (e.g., the first surface 311) and a plurality of second surfaces 412 (e.g., the second surfaces 312), a display 461 (e.g., the display 361), and a cover 415 (e.g., the cover 315). In an embodiment, the cover 415 may be formed of a metal material.

The electronic device 401 may include a camera module 480 (e.g., the camera module 380) including a camera exterior portion 481 (e.g., the camera exterior portion 381), a first camera module 482 (e.g., the first camera module 382), and a second camera module 483 (e.g., the second camera module 383). The electronic device 401 may include a first PCB 421 (e.g., the first PCB 321), a second PCB 423 (e.g., the second PCB 323), and an interposer 422 (e.g., the interposer circuit board or interposer 322). The electronic device 401 may include a battery module 489 (e.g., the battery module 389), a sound output module 455 (e.g., the sound output module 355), and a third PCB 424 (e.g., the third PCB 324).

The electronic device 401 may include an antenna assembly 440 including a plurality of antennas 441 (e.g., the first antenna 341*a*, the second antenna 341*b*, and the third antenna 341*c*), a ground layer 442 (e.g., the ground layer 342), a plurality of feed lines (e.g., the first feed line 343*a*, the second feed line 343*b*, and the third feed line 343*c*), a connector 444 (e.g., the connector 344), and a plurality of traces (e.g., the first trace 345*a* and the second trace 345*b*).

In an embodiment, the electronic device 401 may include a fastening part 431 (e.g., the fastening part 331) and a damage suppressor 432 (e.g., the damage suppressor 332).

In an embodiment, the electronic device 401 may include a plurality of radiation apertures 416 formed in the cover 415 to overlap the plurality of antennas 441, respectively. In an embodiment, an area of each of the plurality of radiation apertures 416 may be substantially the same as or greater than an area of each of the plurality of antennas 441 overlapping the plurality of radiation apertures 416. In an embodiment, a portion of the cover 415 in which the plurality of radiation apertures 416 are formed may be formed of a material different from that of the other portions. For example, the portion in which the plurality of radiation apertures 416 are formed may be covered with colored sub-cover(s) formed of polycarbonate or glass. In an embodiment, the sub-cover(s) may be invisible to a user when viewed from the exterior of the electronic device 401 (e.g., the exterior of the electronic device 401 of FIG. 4A). In an embodiment, the sub-cover(s) may have a cavity structure that allows only electromagnetic waves to pass therethrough.

Figure 5A:
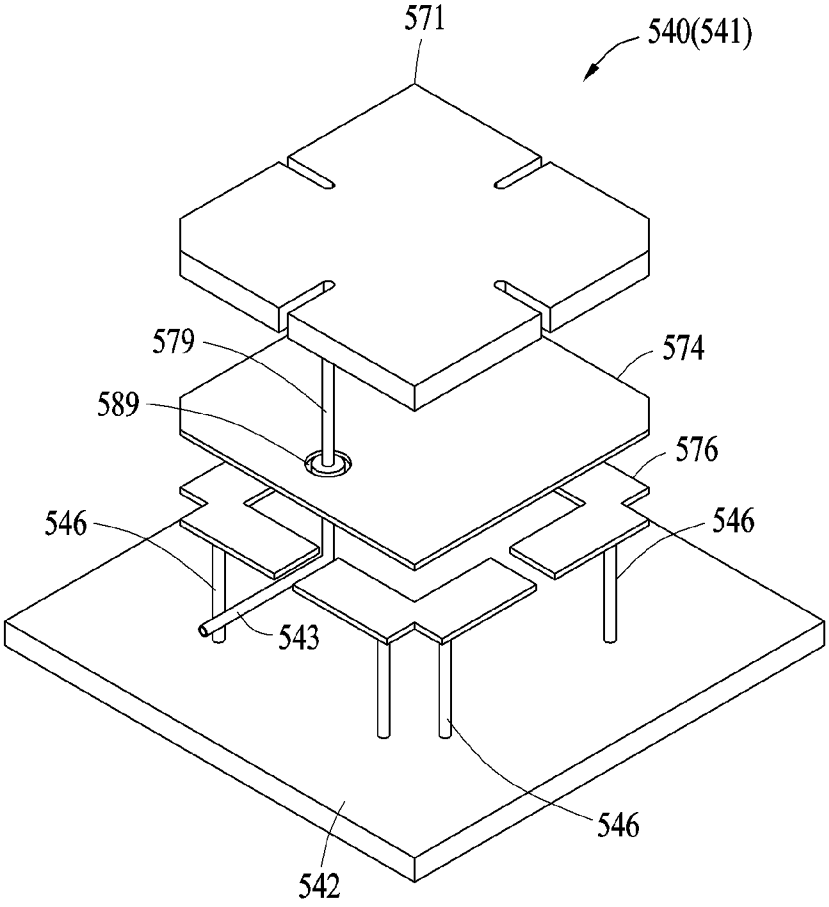
FIG. 5A is a diagram of an antenna or an antenna assembly according to an embodiment.
Figure 5B:
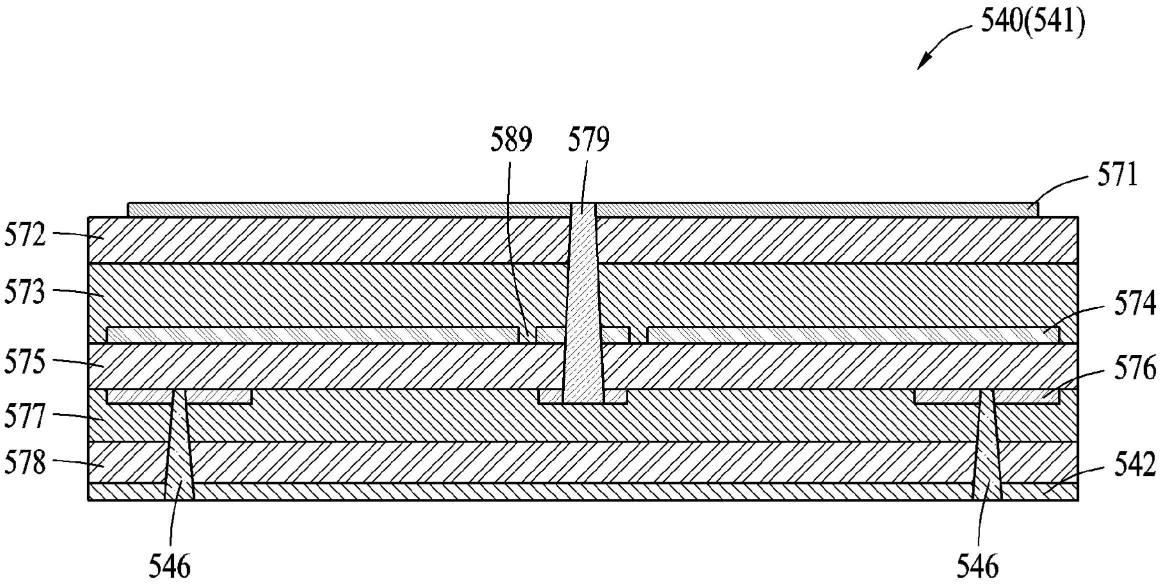
FIG. 5B is a diagram of an antenna or an antenna assembly according to an embodiment.
Figure 5C:
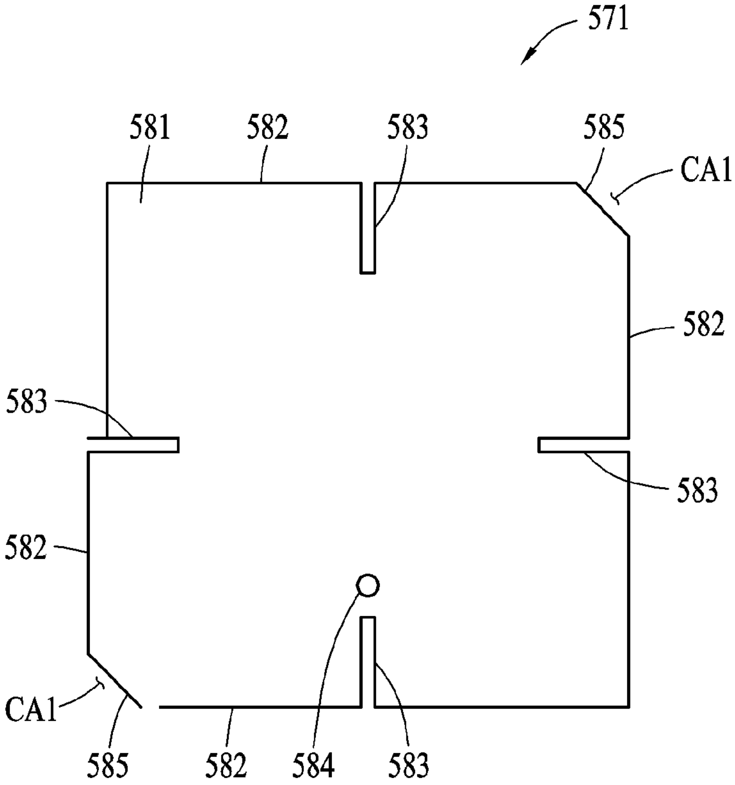
FIG. 5C is a diagram of a first radiating layer according to an embodiment.
Figure 5D:
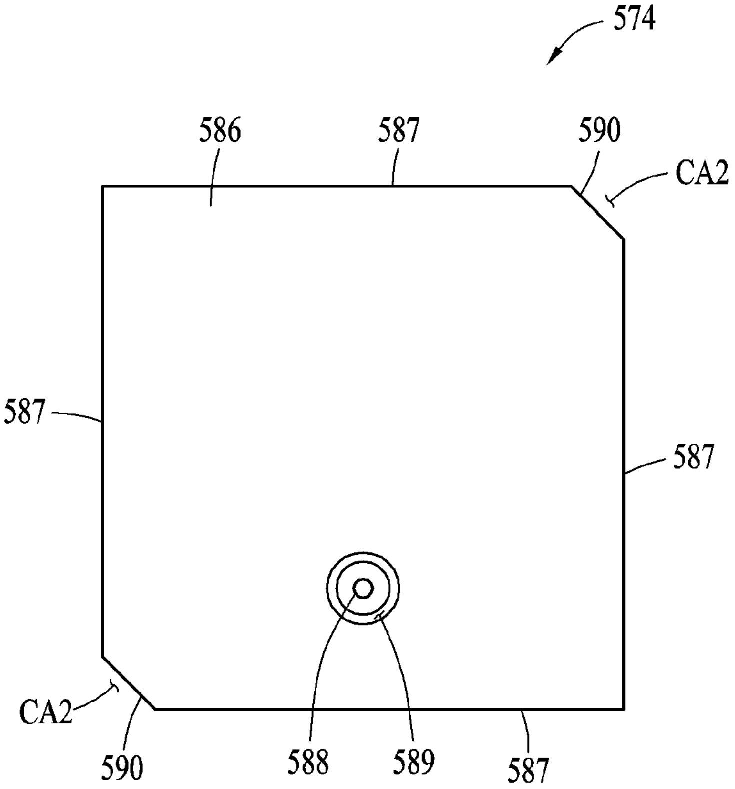
FIG. 5D is a diagram of a second radiating layer according to an embodiment.
Figure 5E:
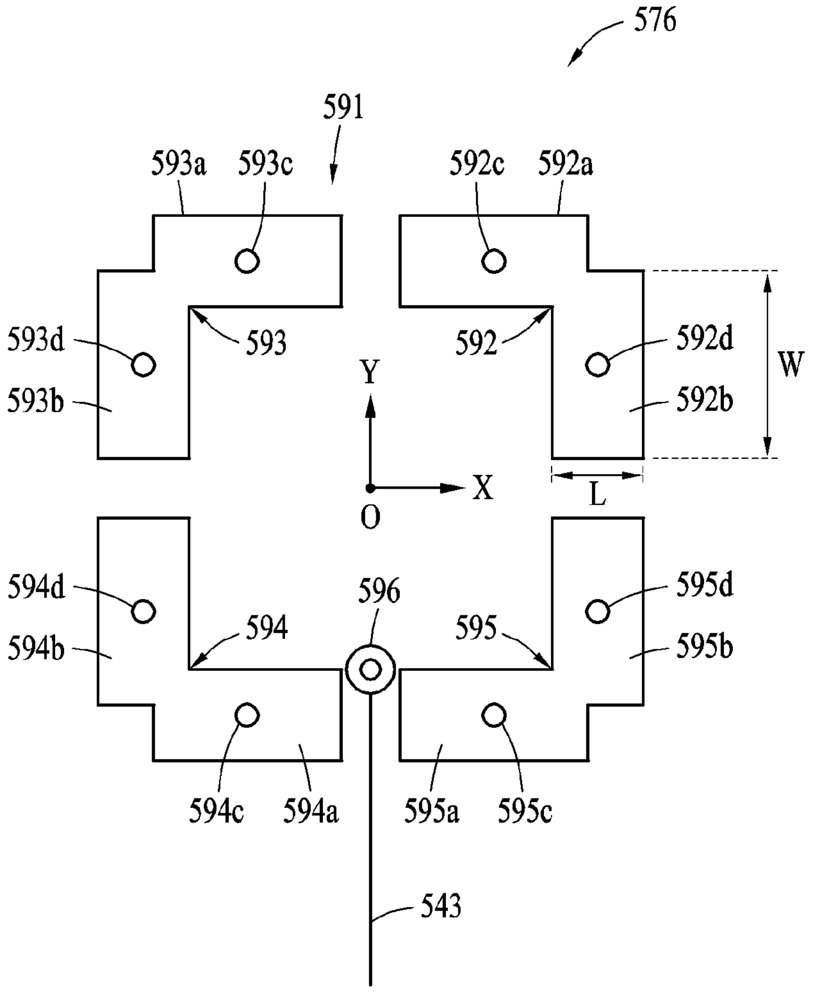
FIG. 5E is a diagram of a feeding layer according to an embodiment.
Figure 5F:
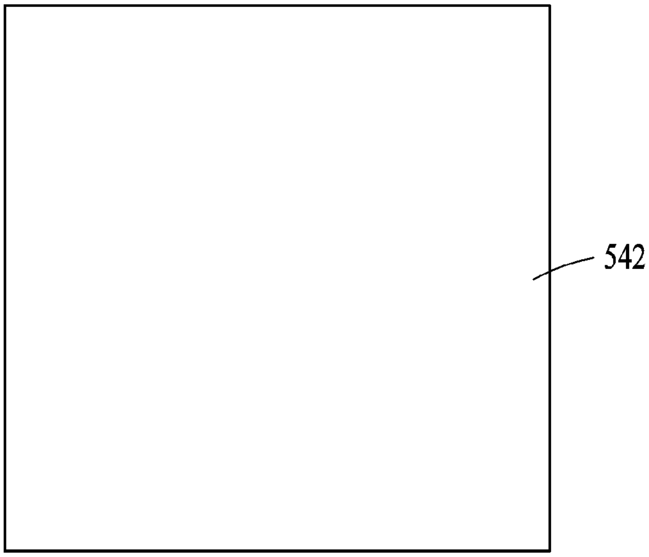
FIG. 5F is a diagram of a ground layer according to an embodiment.

FIG. 5A is a diagram of an antenna or an antenna assembly according to an embodiment. FIG. 5B is a diagram of an antenna or an antenna assembly according to an embodiment. FIG. 5C is a diagram of a first radiating layer according to an embodiment. FIG. 5D is a diagram of a second radiating layer according to an embodiment. FIG. 5E is a diagram of a feeding layer according to an embodiment. FIG. 5F is a diagram of a ground layer according to an embodiment.

Referring to FIGS. 5A to 5F, an antenna 541 (or an antenna assembly 540) according to an embodiment may have a four-layer stacked structure including a ground layer 542, a feeding layer 576, a second radiating layer 574, and a first radiating layer 571, when viewed in a stacking direction (e.g., the +/−z direction of FIG. 2B).

The antenna 541 may include a first dielectric layer 572 positioned between the first radiating layer 571 and the second radiating layer 574, a second dielectric layer 575 positioned between the second radiating layer 574 and the feeding layer 576, and a third dielectric layer 578 positioned between the feeding layer 576 and the ground layer 542. In an embodiment, the first dielectric layer 572, the second dielectric layer 575, and the third dielectric layer 578 may be at least partially formed of a copper clad laminate. In another embodiment, the first dielectric layer 572, the second dielectric layer 575, and the third dielectric layer 578 may be at least partially formed of polyimide or modified polyimide. In an embodiment, a dielectric of the first dielectric layer 572, the second dielectric layer 575, and the third dielectric layer 578 may have a permittivity ranging between about 2.8 to about 3.2 or a permittivity of about 3.3. In an embodiment, the dielectric may have a loss characteristic with a loss tangent within about 0.004 to about 0.02. In an embodiment, the first dielectric layer 572, the second dielectric layer 575, and the third dielectric layer 578 may have a thickness of about 50 μm.

The antenna 541 may include a fourth dielectric layer 573 bonding the first dielectric layer 572 and the second dielectric layer 575, and a fifth dielectric layer 577 bonding the second dielectric layer 575 and the third dielectric layer 578. In an embodiment, a dielectric of the fourth dielectric layer 573 and the fifth dielectric layer 577 may have a permittivity ranging between about 2.3 to about 3.0 or a permittivity of about 2.8. In an embodiment, the dielectric may have a loss characteristic with a loss tangent within about 0.004 to about 0.02. In an embodiment, the fourth dielectric layer 573 may have a thickness of about 100 μm, and the fifth dielectric layer 577 may have a thickness of about 50 μm.

In an embodiment, the first radiating layer 571 may include a first radiation patch 581 with a half wavelength that operates on a first band (e.g., about 7.75 to 8.25 GHz). The first radiating layer 571 may include the first radiation patch 581 having a plurality of first edges 582, a plurality of slits 583 formed on the first radiation patch 581 while extending from the plurality first edges 582, and a first feed point 584. A length of the plurality of slits 583 may determine a resonant frequency and/or a signal magnitude of the first radiating layer 571. In an embodiment, each of the plurality of slits 583 may extend from a central portion of each of the plurality of first edges 582. In an embodiment, the first feed point 584 may be offset from a central portion of the first radiation patch 581.

In an embodiment, the first radiation patch 581 may include a plurality of (e.g., two) first cut edges 585 each positioned between a pair of first edges 582 adjacent to each other. A first cut edge 585 may be formed by cutting at least a portion of a portion in which a pair of first edges 582 adjacent to each other are connected. A plurality of (e.g., two) first cut areas CA1 defined by the first cut edges 585 may enable the first radiating layer 571 to generate circular polarization. An area of each of the first cut areas CA1 may determine an axial ratio of the circular polarization generated by the first radiating layer 571. In an embodiment, the plurality of first cut edges 585 may be formed at positions opposite to each other in the first radiation patch 581.

In an embodiment, the second radiating layer 574 may include a second radiation patch 586 with a half wavelength that operates on a second band (e.g., about 6.25 to 6.75 GHz) independently of the first radiating layer 571. The second radiating layer 574 may include a second radiation patch 586 having a plurality of second edges 587, and a second feed point 588. In an embodiment, the second feed point 588 may be offset from a central portion of the second radiation patch 586.

In an embodiment, the second radiating layer 574 may include an annular slot 589 surrounding the second feed point 588 and defining a gap with the second feed point 588. An electric field may be formed between the second feed point 588 and the second radiation patch 586 to indirectly feed the second radiation patch 586.

In an embodiment, the second radiation patch 586 may include a plurality of (e.g., two) second cut edges 590 each positioned between a pair of second edges 587 adjacent to each other. A second cut edge 590 may be formed by cutting at least a portion of a portion in which a pair of second edges 587 adjacent to each other are connected. A plurality of (e.g., two) second cut areas CA2 defined by the second cut edges 590 may cause the second radiating layer 574 to generate circular polarization. An area of each of the second cut areas CA2 may determine an axial ratio of the circular polarization generated by the second radiating layer 574. In an embodiment, the plurality of second cut edges 590 may be formed at positions opposite to each other in the second radiation patch 586.

In some embodiments not shown, the second radiating layer 574 may include a plurality of second slits formed in the plurality of second edges 587.

The feeding layer 576 may include a coupling patch 591 having a coupling pattern that determines an amount of capacitive coupling between the second radiating layer 574 and the ground layer 542. The amount of capacitive coupling determined by the coupling pattern of the coupling patch 591 may be determined based on dimensions (e.g., a width, a length and/or an area according to the combination thereof) of the coupling pattern and/or a height or thickness of layer(s) (e.g., the fifth dielectric layer 477 and the third dielectric layer 478) formed by dielectric(s) positioned between the second radiating layer 574 and the ground layer 542. As the area of the coupling pattern of the coupling patch 591 increases and as the distance between the second radiating layer 574 and the feeding layer 576 decreases, the amount of capacitive coupling may increase. Advantageously, as the amount of capacitive coupling increases, the size of the second radiation patch 586 may decrease, which may lead to a decrease in the size of the antenna 541. As described above, the amount of capacitive coupling determined by the coupling patch 591 may determine a resonant frequency at which the second radiation patch 586 operates.

In an embodiment, the coupling patch 591 may have a coupling pattern that is symmetric with respect to an imaginary centerline (e.g., an X-axis and/or a Y-axis). For example, the coupling patch 591 may include a first section 592 positioned in a first area (e.g., an upper right area) based on a first imaginary centerline (e.g., the Y-axis), a second section 593 positioned in a second area (e.g., an upper left area) opposite to the first area based on the first imaginary centerline, a third section 594 positioned in a third area (e.g., a lower left area) opposite to the second area based on the second imaginary centerline (e.g., the X-axis), and a fourth section 595 positioned in a fourth area (e.g., a lower right area) opposite to the third area based on the first imaginary centerline and opposite to the first area based on the second imaginary centerline.

In an embodiment, the plurality of sections 592, 593, 594, and 595 may be positioned to be physically separated from each other.

In an embodiment, the plurality of sections 592, 593, 594, and 595 may respectively include a plurality of subsections 592*a*, 592*b*, 593*a*, 593*b*, 594*a*, 594*b*, 595*a*, and 595*b* each having a width W and a length L. At least one ground point 592*c*, 592*d*, 593*c*, 593*d*, 594*c*, 594*d*, 595*c*, and 595*d* connected to the ground layer 542 may be respectively positioned in the plurality of subsections 592*a*, 592*b*, 593*a*, 593*b*, 594*a*, 594*b*, 595*a*, and 595*b*.

In an embodiment, the edges of the plurality of sections 592, 593, 594, and 595 may not overlap the second edges 587 of the second radiation patch 586 and the second cut edges 590.

In another embodiment not shown, the coupling patch 591 may be implemented as a single section for forming various patterns, rather than the plurality of coupling sections 592, 593, 594, and 595.

In an embodiment, the feeding layer 576 may include a third feed point 596 positioned between the plurality of sections 592, 593, 594, and 595. The third feed point 596 may be offset from a central portion of the feeding layer 576. The third feed point 596 may be positioned on a feed line 543 (e.g., an end portion of the feed line 543).

The antenna 541 may include the feed line 543 positioned on substantially the same plane as the feeding layer 576. In an embodiment, the feed line 543 may have an impedance of about 50 ohms. In an embodiment, the feed line 543 may include a matching stub. The antenna 541 may include a signal via 579 connecting the first radiating layer 571, the second radiating layer 574, and the feed line 543. For example, the signal via 579 may connect the first feed point 584, the second feed point 588, and the third feed point 596. In an embodiment, the signal via 579 may be positioned in an area within the annular slot 589 when connected to the second feed point 588. The antenna 541 may include a ground via 546 connecting the ground points 592*c*, 592*d*, 593*c*, 593*d*, 594*c*, 594*d*, 595*c*, and 595*d* and the ground layer 542.

Figure 6A:
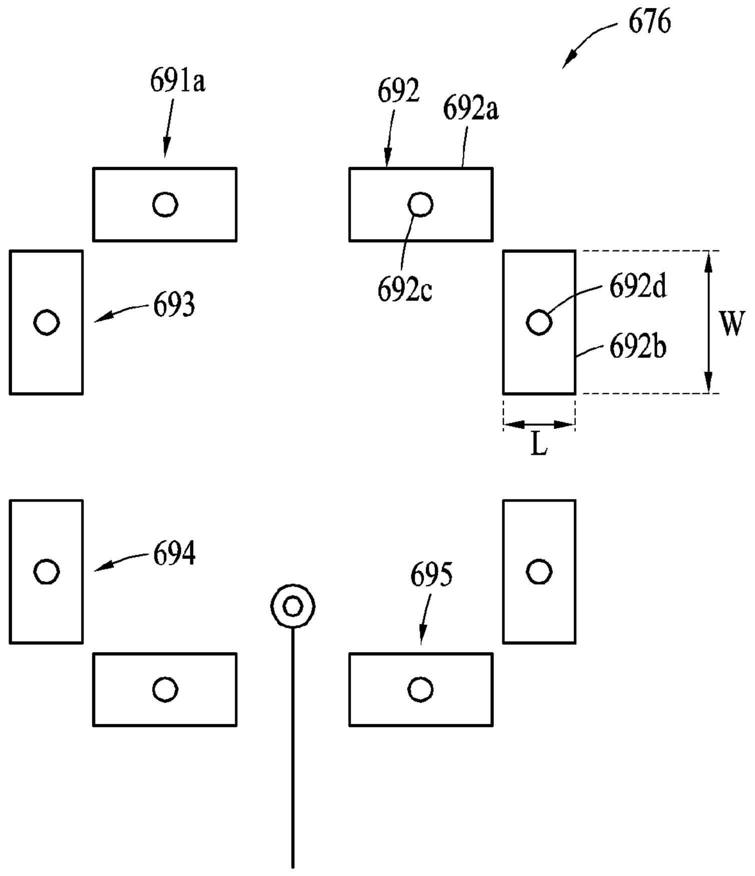
FIG. 6A is a diagram of a feeding layer according to an embodiment.
Figure 6B:
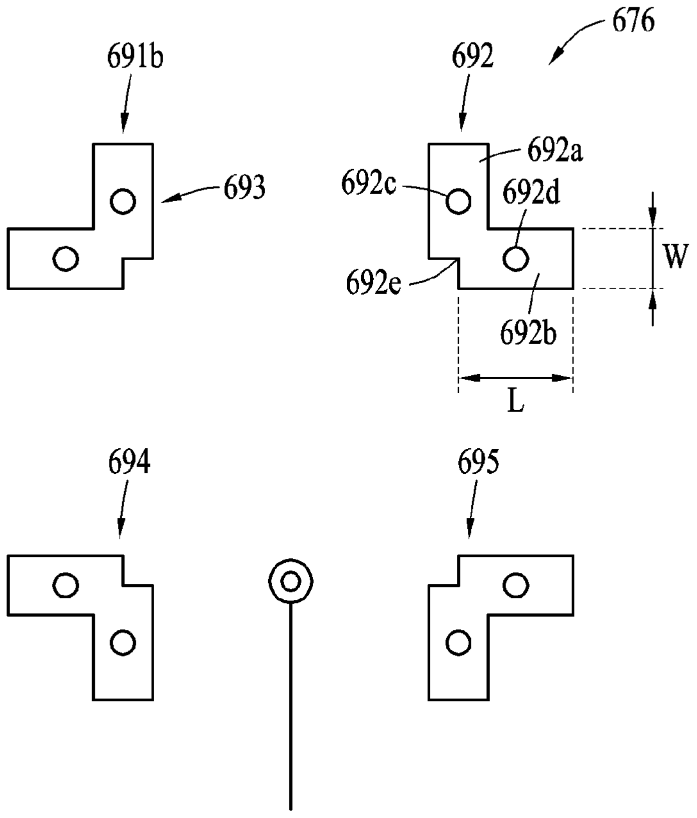
FIG. 6B is a diagram of a feeding layer according to an embodiment.
Figure 6C:
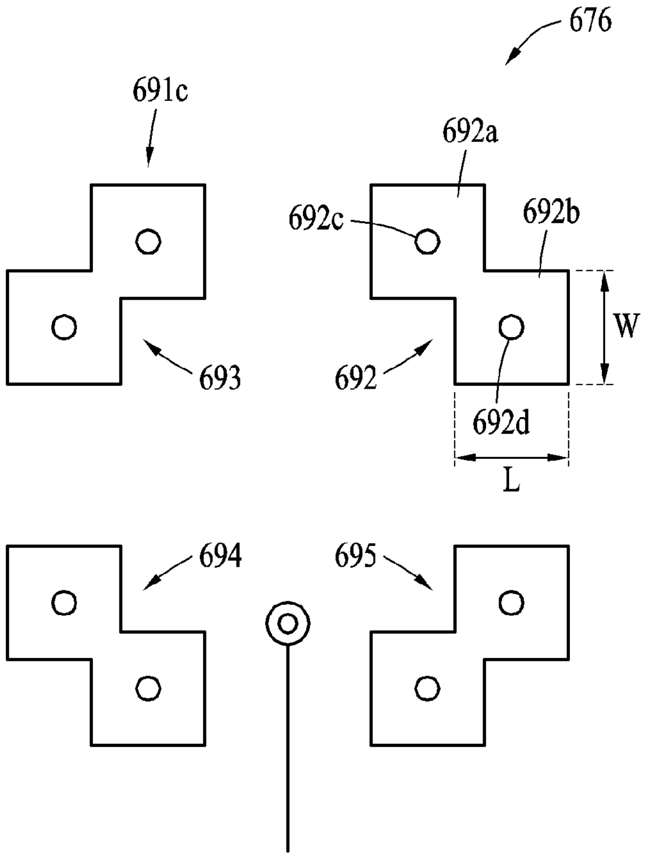
FIG. 6C is a diagram of a feeding layer according to an embodiment.
Figure 6D:
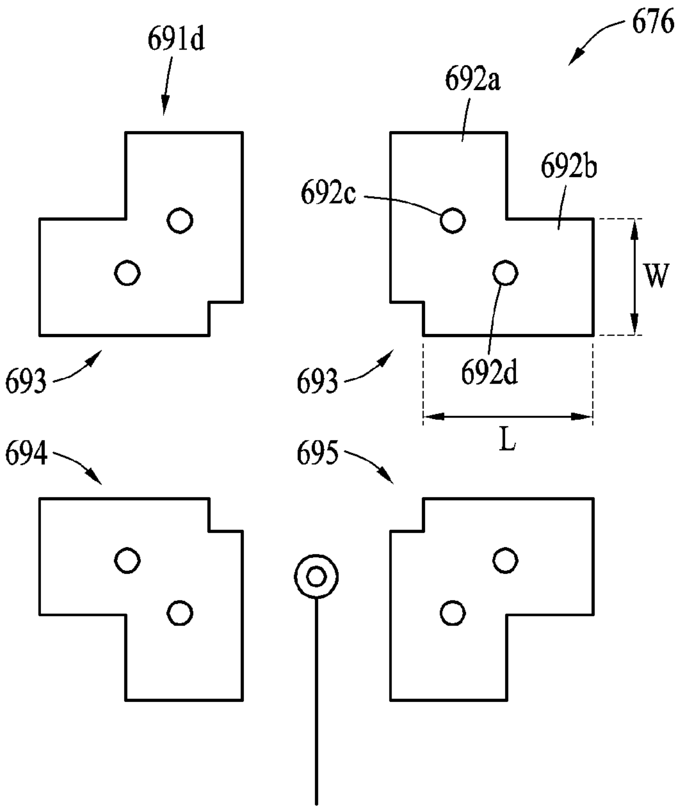
FIG. 6D is a diagram of a feeding layer according to an embodiment.

FIG. 6A is a diagram of a feeding layer according to an embodiment. FIG. 6B is a diagram of a feeding layer according to an embodiment. FIG. 6C is a diagram of a feeding layer according to an embodiment. FIG. 6D is a diagram of a feeding layer according to an embodiment.

Referring to FIGS. 6A to 6D, a feeding layer 676 (e.g., the feeding layer 576) may have a coupling pattern according to various dimensions (e.g., a width W and/or a length L).

Referring to FIG. 6A, a coupling patch 691*a* (e.g., the coupling patch 591) according to an embodiment may include a plurality of coupling sections 692, 693, 694, and 695 (e.g., the plurality of sections 592, 593, 594, and 595). The plurality of coupling sections 692, 693, 694, and 695 may include a first subsection 692*a* and a second subsection 692*b* that are separated from each other, where the first subsection 692*a* and the second subsection 692*a* 692*b* may include at least one ground point 692*c* and 692*d*, respectively. The width W (e.g., about 2 mm) of each of the subsections 692*a* and 692*b* may be greater than the length L (e.g., about 1 mm) thereof. The plurality of first subsections 692*a* and second subsections 692*b* may be arranged along an edge of the coupling patch 691*a*.

Referring to FIG. 6B, a coupling patch 691*b* according to an embodiment may include a plurality of coupling sections 692, 693, 694, and 695. The plurality of coupling sections 692, 693, 694, and 695 may include a first subsection 692*a* and a second subsection 692*b* that are connected to each other, where the first subsection 692*a* and the second subsection 692*a* 692*b* may include at least one ground point 692*c* and 692*d*, respectively. A partial area of the first subsection 692*a* and a partial area of the second subsection 692*b* may overlap each other between the first subsection 692*a* and the second subsection 692, whereby notches 692*e* of various shapes (e.g., a square shape) may be formed. The width W (e.g., about 1 mm) of each of the subsections 692*a* and 692*b* may be less than the length L (e.g., about 2 mm) thereof. The plurality of first subsections 692*a* and second subsections 692*b* may be positioned to surround the corners of the coupling patch 691*a*.

Referring to FIG. 6C, a coupling patch 691*c* according to an embodiment may include a plurality of coupling sections 692, 693, 694, and 695. The plurality of coupling sections 692, 693, 694, and 695 may include a first subsection 692*a* and a second subsection 692*b* that are connected to each other, where the first subsection 692*a* and the second subsection 692*a* 692*b* may include at least one ground point 692*c* and 692*d*, respectively. The width W (e.g., about 2 mm) of each of the subsections 692*a* and 692*b* may be substantially the same as the length L (e.g., about 2 mm) thereof.

Referring to FIG. 6D, a coupling patch 691*d* according to an embodiment may include a plurality of coupling sections 692, 693, 694, and 695. The plurality of coupling sections 692, 693, 694, and 695 may include a first subsection 692*a* and a second subsection 692*b* that are connected to each other, where the first subsection 692*a* and the second subsection 692*a* 692*b* may include at least one ground point 692*c* and 692*d*, respectively. The width W (e.g., about 2 mm) of each of the subsections 692*a* and 692*b* may be less than the length L (e.g., about 3 mm) thereof.

Figure 7A:
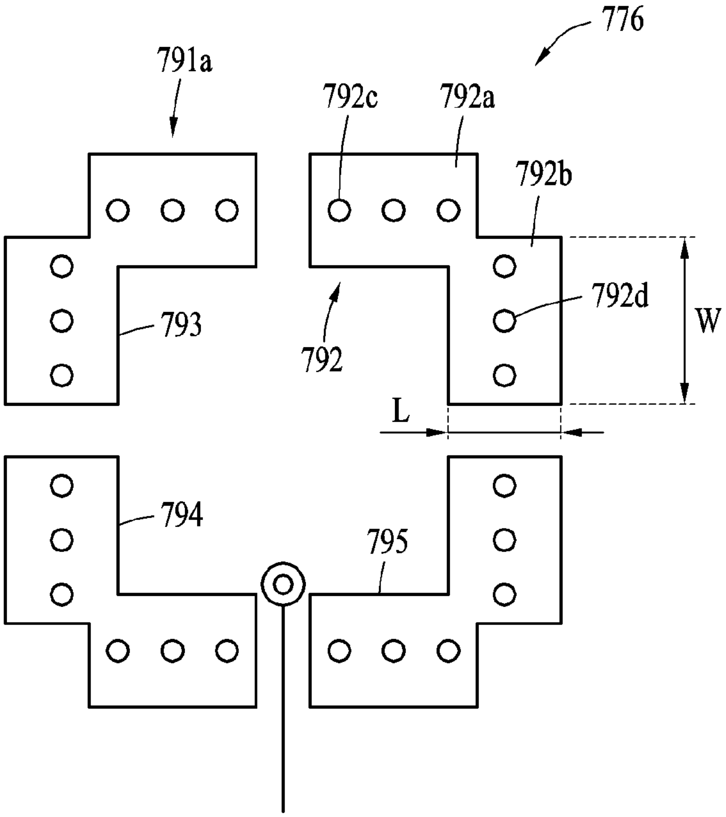
FIG. 7A is a diagram of a feeding layer according to an embodiment.
Figure 7B:
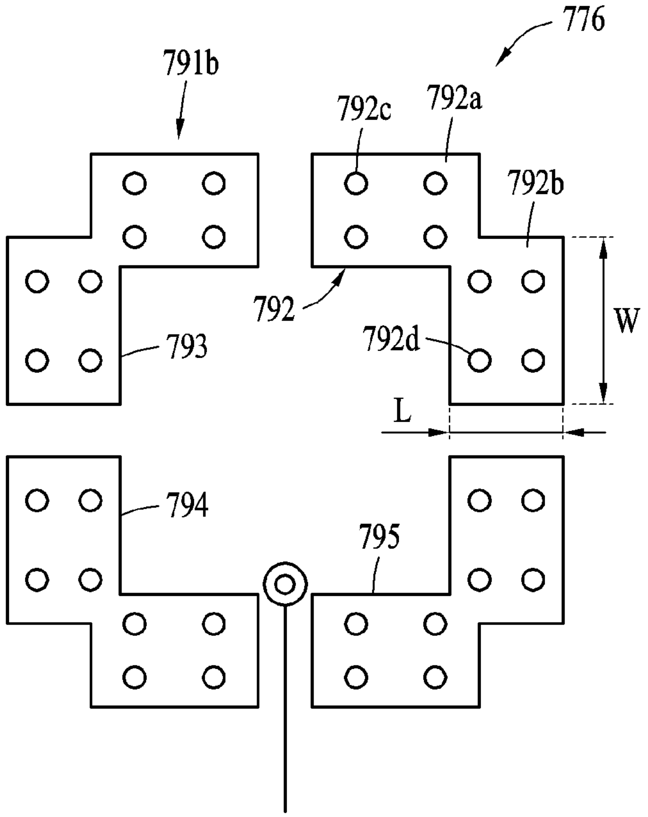
FIG. 7B is a diagram of a feeding layer according to an embodiment.
Figure 7C:
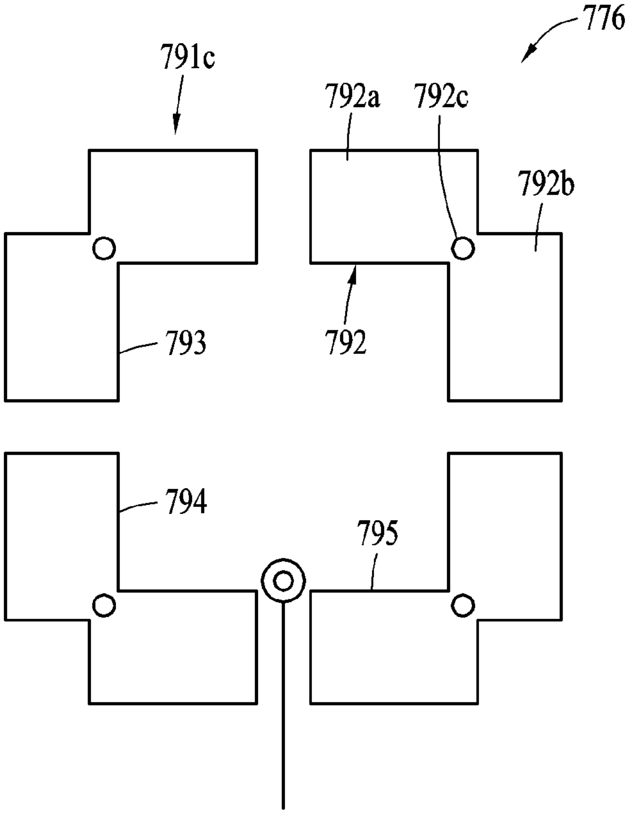
FIG. 7C is a diagram of a feeding layer according to an embodiment.

FIG. 7A is a diagram of a feeding layer according to an embodiment. FIG. 7B is a diagram of a feeding layer according to an embodiment. FIG. 7C is a diagram of a feeding layer according to an embodiment.

Referring to FIGS. 7A to 7C, a feeding layer 776 (e.g., the feeding layer 576) may include a plurality of sections 792, 793, 794, and 795 including ground points 792*c* and 792*d* (e.g., the ground points 592*c*, 592*d*, 593*c*, 593*d*, 594*c*, 494*d*, 495*c*, and 495*d*) in various numbers and arrangements. Referring to FIG. 7A, a plurality of sections 792, 793, 794, and 795 of a coupling patch 791*a* according to an embodiment may each include a plurality of (e.g., three) ground points 792*c*, 792*d* arranged in a line in a width direction of each subsection 792*a*, 792*b*. Referring to FIG. 7B, a plurality of sections 792, 793, 794, and 795 of a coupling patch 791*b* according to an embodiment may each include a plurality of (e.g., four) ground points 792*c*, 792*d* arranged in a width direction and a length direction of each subsection 792*a*, 792*b*. The plurality of ground points 792*c*, 792*d* may be in a matrix form in each subsection 792*a*, 792*b*. Referring to FIG. 7C, a plurality of sections 792, 793, 794, and 795 of a coupling patch 791*c* according to an embodiment may include at least one (e.g., a single) ground point 792*c* in a portion where a first subsection 792*a* and a second subsection 792*b* are connected, in other words, a portion where a partial area of the first subsection 792*a* and a partial area of the second subsection 792*b* overlap.

Figure 8A:
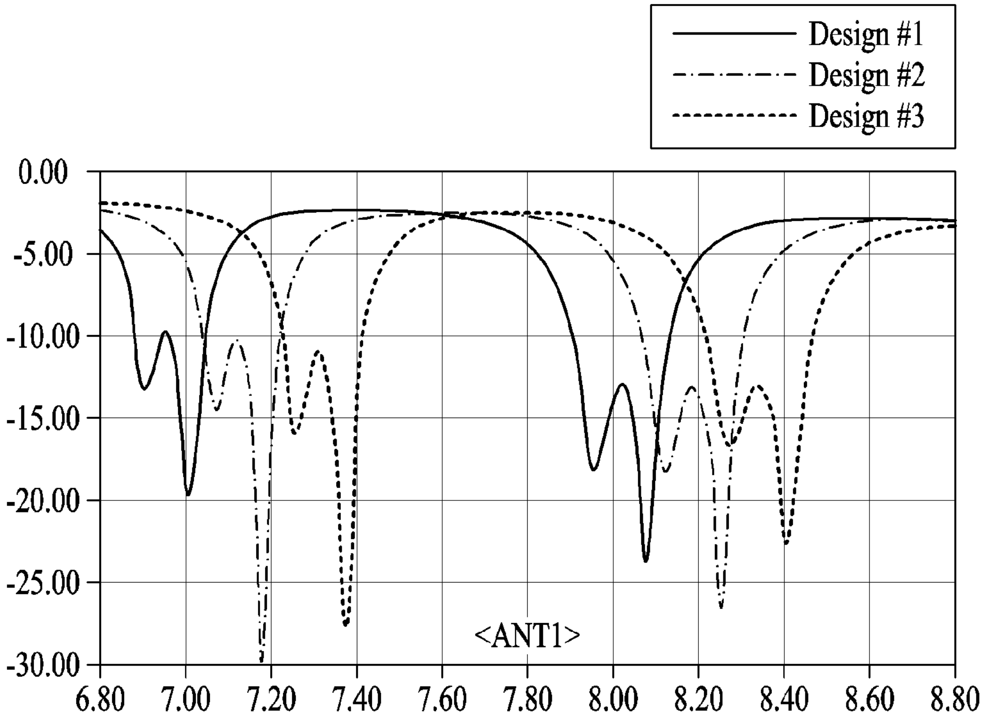
FIG. 8A is a graph illustrating a resonant frequency of a first antenna in an antenna assembly according to various embodiments.
Figure 8B:
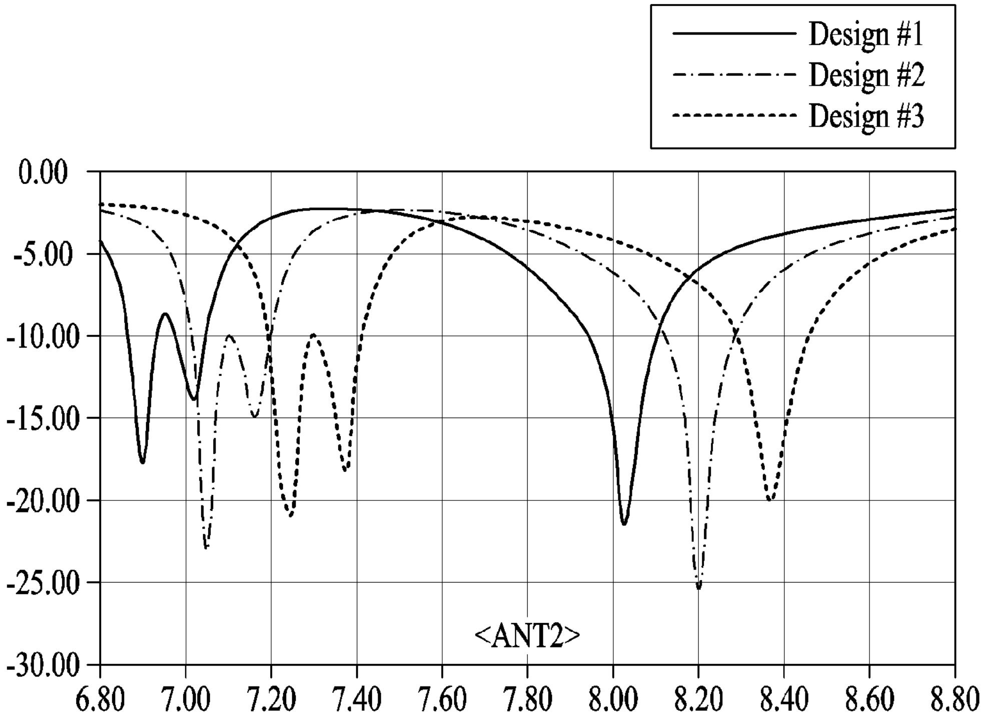
FIG. 8B is a graph illustrating a resonant frequency of a second antenna in an antenna assembly according to various embodiments.
Figure 8C:
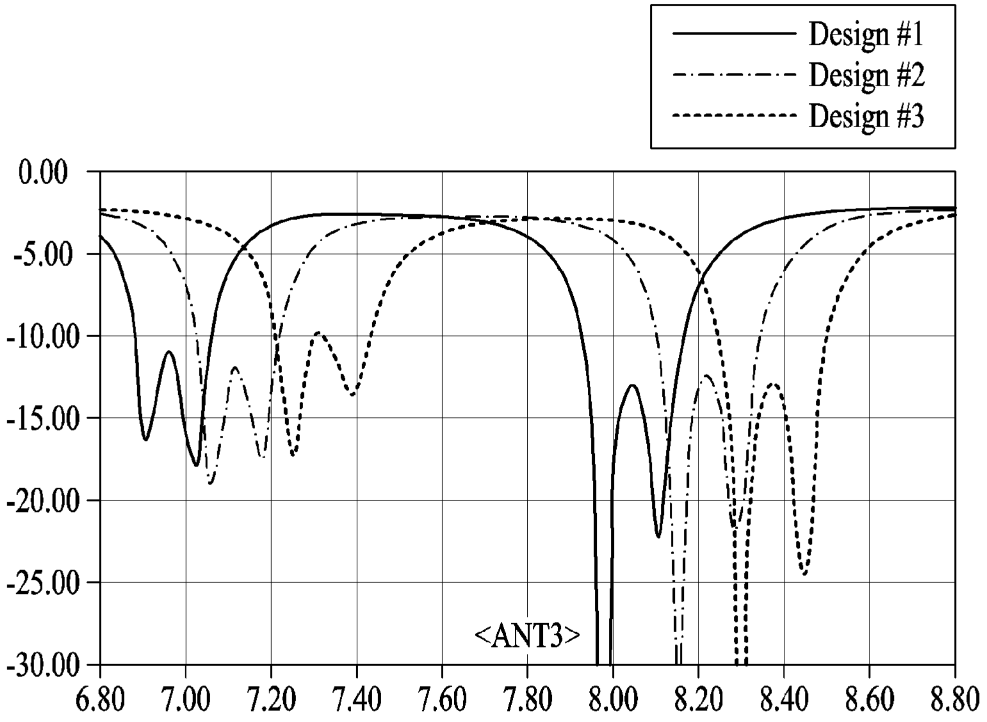
FIG. 8C is a graph illustrating a resonant frequency of a third antenna in an antenna assembly according to various embodiments.

FIG. 8A is a graph illustrating a resonant frequency of a first antenna in an antenna assembly according to various embodiments. FIG. 8B is a graph illustrating a resonant frequency of a second antenna in an antenna assembly according to various embodiments. FIG. 8C is a graph illustrating a resonant frequency of a third antenna in an antenna assembly according to various embodiments.

Referring to FIGS. 8A to 8C, graphs of variances of a resonant frequency measured for an antenna assembly (e.g., the antenna assembly 340) according to various embodiments, having a length of a slit (e.g., the slit 583) of a first radiating layer (e.g., the first radiating layer 571) and a width W and a length L of a coupling patch (e.g., the coupling patch 591) of each of a first antenna ANTI (e.g., the first antenna 341*a*), a second antenna ANT2 (e.g., the second antenna 341*b*), and a third antenna ANT3 (e.g., the third antenna 341*c*), are illustrated. Design #1 was set to be 1.9 mm in slit length, 1 mm in width, and 1.85 mm in length, Design #2 was set to be 1.7 mm in slit length, 1 mm in width, and 1.45 mm in length, and Design #3 was set to be 1.5 mm in slit length, 1 mm in width, and 1.15 mm in length.

The graphs show that a resonant frequency of a second radiating layer of each of the three antennas has a low shift of about 200 MHz in proportion to an area (e.g., width× length) of a coupling patch. In other words, the resonant frequency of the second radiating layer may be designed to be low by adjusting the area of the coupling patch without changing the area of a second radiation patch (e.g., the second radiation patch 586) (that is, while fixing the area without slit application), which may allow miniaturization of the antenna assembly.

Meanwhile, the graphs also show that a resonant frequency of a first radiating layer of each of the three antennas may be adjusted by the length of a slit formed in a first radiation patch, independently of the resonant frequency of the second radiating layer and that the resonant frequency of the first radiating layer of each of the three antennas has a low shift of about 200 MHz in proportion to the length of the slit. This shows the advantage that the resonant frequency of the first radiating layer may be implemented to be low by adjusting the length of the slit while fixing the area of the first radiation patch and may be adjusted independently of the resonant frequency of the second radiating layer.

According to the above embodiments, it may be shown that the resonant frequency of the first radiating layer may be determined through the slit of the first radiating layer and that the resonant frequency of the second radiating layer (e.g., the second radiating layer 574) may be determined through a coupling pattern of a feeding layer independently of the resonant frequency of the first radiating layer. In other words, the resonant frequency of each of the first radiating layer and the second radiating layer may be determined according to the size of each of the first radiating layer and the second radiating layer. The resonant frequency may be adjusted by changing the permittivity of dielectric(s) adjacent to each of the first radiating layer and the second radiating layer, and the antenna assembly may be miniaturized by reducing the size of the first radiation patch (e.g., the first radiation patch 481) and/or the size of the second radiation patch (e.g., the second radiation patch 486). Meanwhile, since the second radiating layer has a relatively low resonant frequency for operation, the size of the second radiation patch may need to be additionally reduced for the desired operation, which may be achieved by positioning a feeding layer having various coupling patterns between the second radiating layer and a ground layer.

Figure 9:
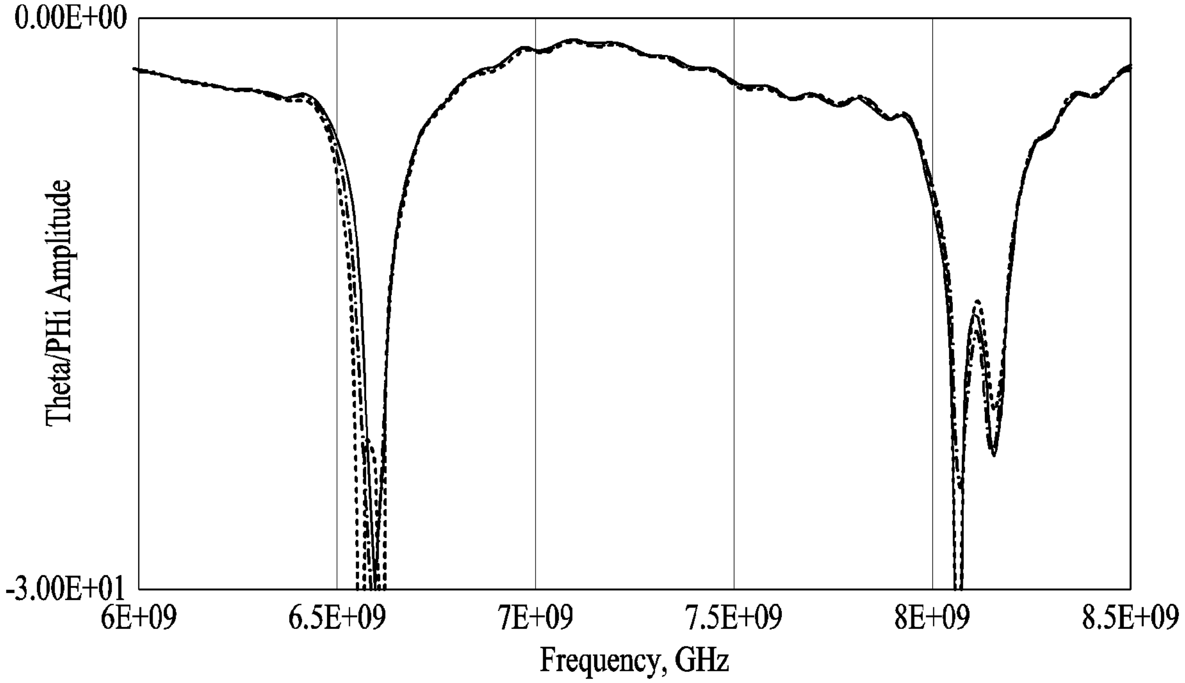
FIG. 9 is a graph illustrating resonant frequencies of a first antenna, a second antenna, and a third antenna of an antenna assembly according to an embodiment.

FIG. 9 is a graph illustrating resonant frequencies of a first antenna, a second antenna, and a third antenna of an antenna assembly according to an embodiment.

From FIGS. 8A to 8C above, it may be shown that the resonant frequency of each of the first radiating layer and the second radiating layer may be independently adjusted by changing various design parameters, and it may also be shown that the performance of an antenna assembly with high correlation having a resonant frequency characteristic as shown in FIG. 9 may be secured through the optimization of resonance points of the three antennas.

Figure 10A:
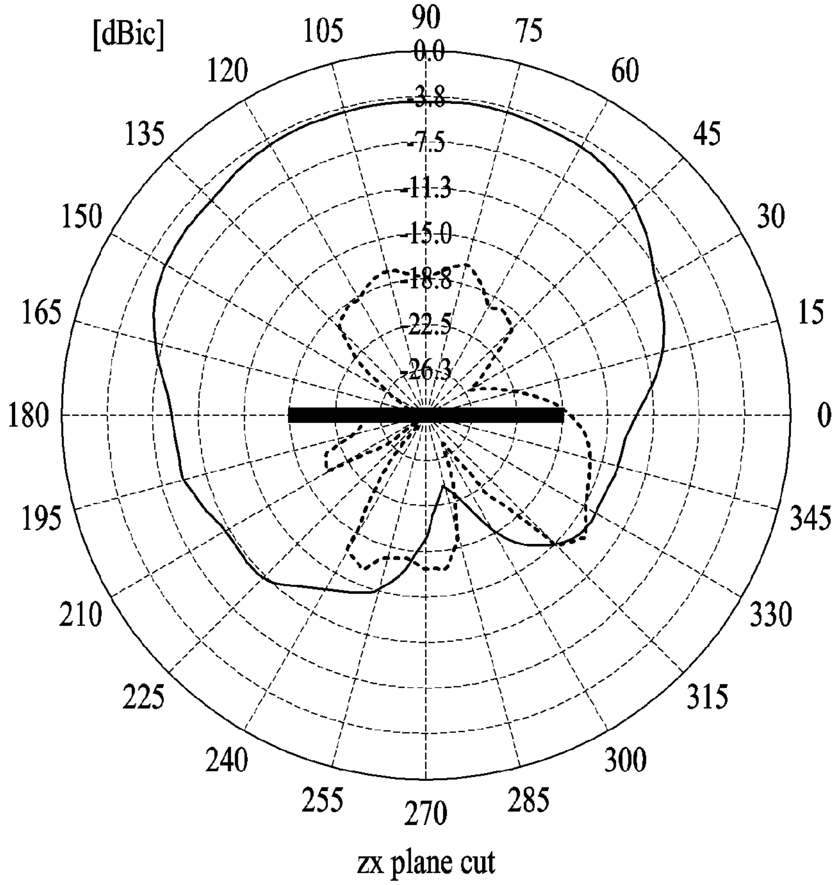
FIG. 10A is a diagram of a radiation pattern of a second radiating layer when an antenna is viewed from a first cut plane according to an embodiment.
Figure 10B:
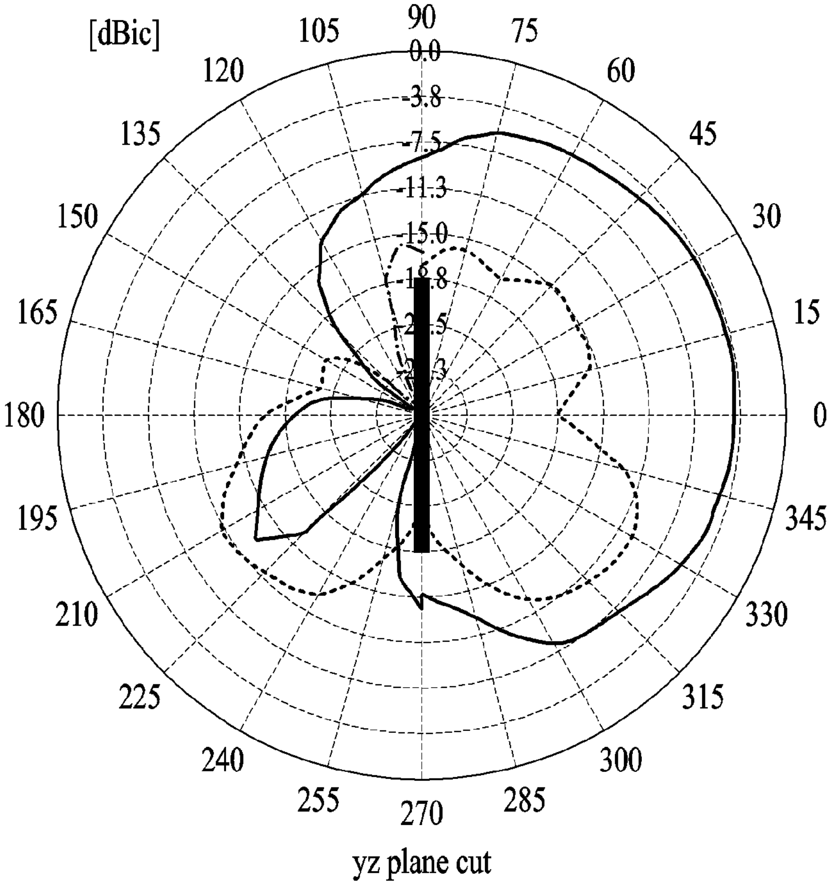
FIG. 10B is a diagram of a radiation pattern of a second radiating layer when an antenna is viewed from a second cut plane according to an embodiment.
Figure 10C:
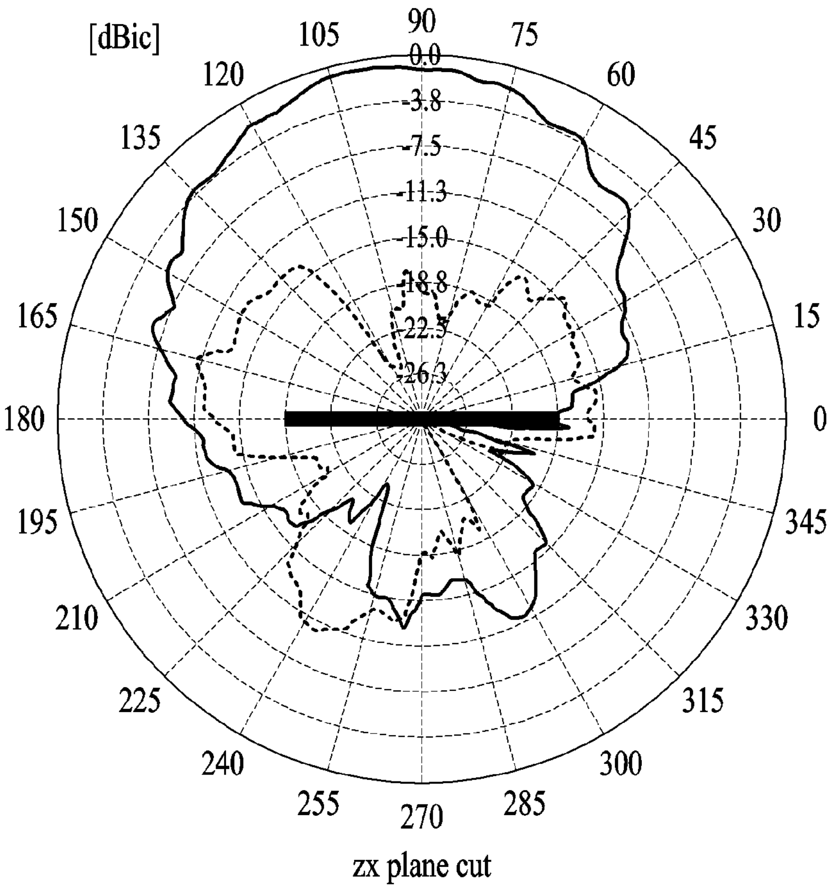
FIG. 10C is a diagram of a radiation pattern of a first radiating layer when an antenna is viewed from a first cut plane according to an embodiment.
Figure 10D:
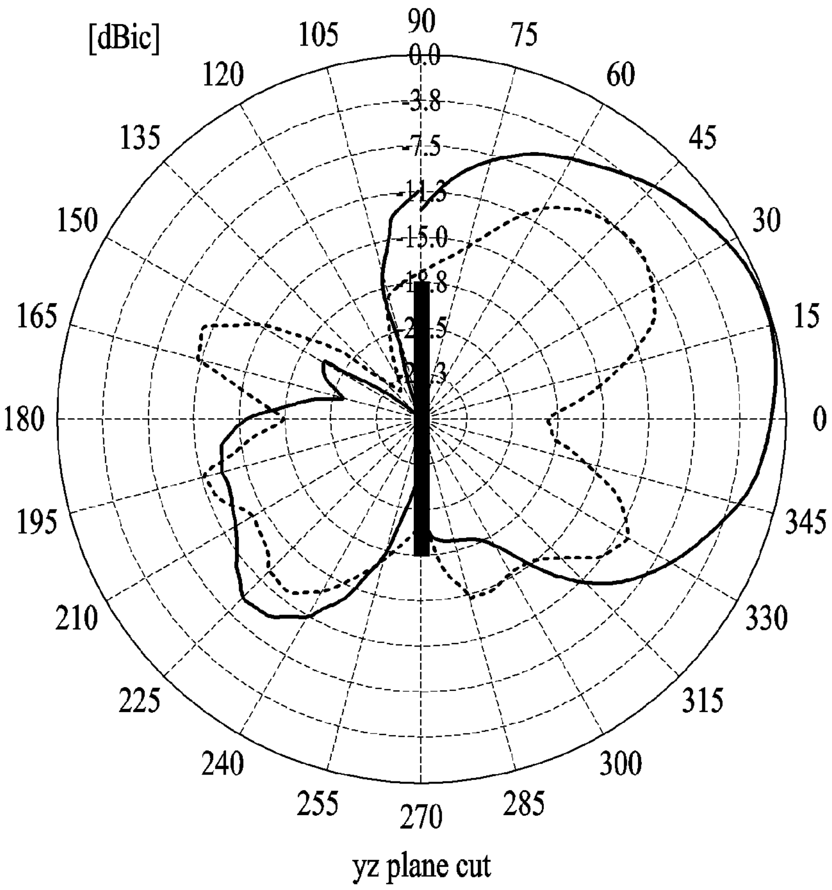
FIG. 10D is a diagram of a radiation pattern of a first radiating layer when an antenna is viewed from a second cut plane according to an embodiment.

FIG. 10A is a diagram of a radiation pattern of a second radiating layer when an antenna is viewed from a first cut plane according to an embodiment. FIG. 10B is a diagram of a radiation pattern of a second radiating layer when an antenna is viewed from a second cut plane according to an embodiment. FIG. 10C is a diagram of a radiation pattern of a first radiating layer when an antenna is viewed from a first cut plane according to an embodiment. FIG. 10D is a diagram of a radiation pattern of a first radiating layer when an antenna is viewed from a second cut plane according to an embodiment.

FIGS. 10A and 10B show radiation patterns of a second radiating layer (e.g., the second radiating layer 574) when the second radiating layer is viewed from a first cut plane (e.g., a ZX plane) and a second cut plane (e.g., a YZ plane), and FIGS. 10C and 10D show radiation patterns of a first radiating layer (e.g., the first radiating layer 571) when the first radiating layer is viewed from the first cut plane and the second cut plane. The radiation patterns of the first radiating layer were measured at a center frequency of about 8 GHz, and the radiation patterns of the second radiating layer were measured at a center frequency of about 6.5 GHz. In these radiation patterns, right-handed circular polarization (RHCP) is a dominant polarization component (Co-pol) (indicated by a solid line), and an orthogonal polarization (X pol) component of left-handed circular polarization (LHCP) is indicated by a dotted line. Both the first radiating layer and the second radiating layer have a polarization purity characteristic of 15 dB or more at the boresight, and the axial ratios of the layers are −2.3 dB and −3.5 dB, respectively. In addition, antennas including these layers exhibit peak gain characteristics of about −3.8 dBic and −0.2 dBic.

Figure 11A:
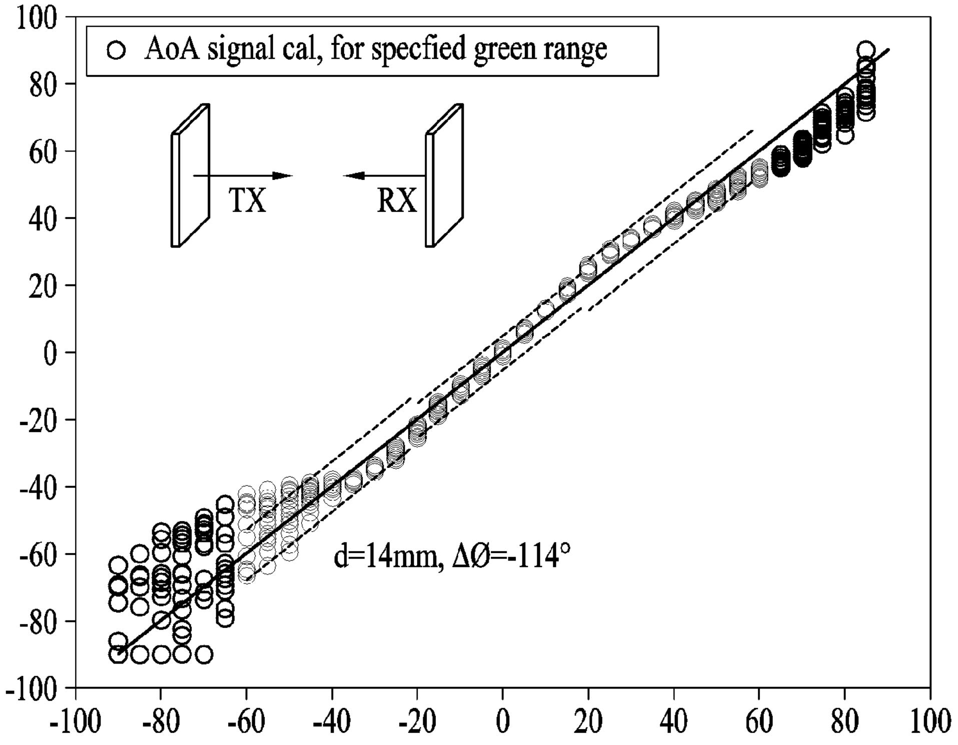
FIG. 11A is a graph illustrating an angle of arrival (AoA) when a transmission-side electronic device and a reception-side electronic device are oriented in substantially the same first pose according to an embodiment.
Figure 11B:
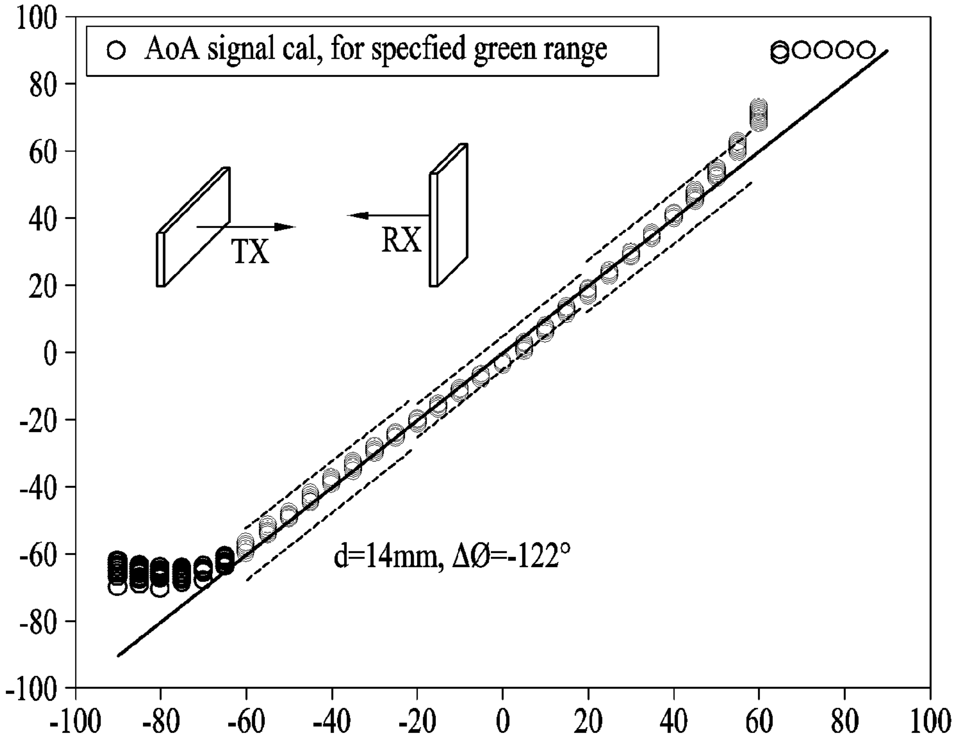
FIG. 11B is a graph illustrating an AoA when a reception-side electronic device is oriented in a first pose and a transmission-side electronic device is oriented in a second pose different from the first pose according to an embodiment.
Figure 11C:
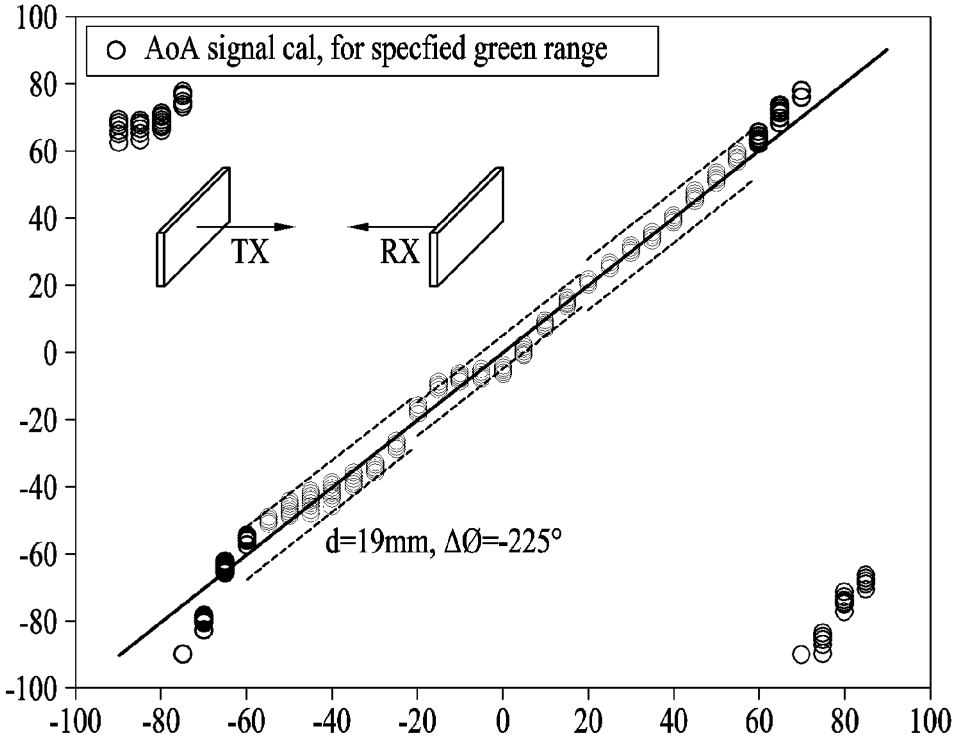
FIG. 11C is a graph illustrating an AoA when a transmission-side electronic device and a reception-side electronic device are oriented in substantially the same second pose according to an embodiment.

FIG. 11A is a graph illustrating an AoA when a transmission-side electronic device and a reception-side electronic device are oriented in substantially the same first pose according to an embodiment. FIG. 11B is a graph illustrating an AoA when a reception-side electronic device is oriented in a first pose and a transmission-side electronic device is oriented in a second pose different from the first pose according to an embodiment. FIG. 11C is a graph illustrating an AoA when a transmission-side electronic device and a reception-side electronic device are oriented in substantially the same second pose according to an embodiment.

Referring to FIGS. 11A to 11C, graphs showing AoA results according to a pose of an electronic device including an antenna for transmission-side polarization (TX) (e.g., linear polarization) and a pose of an electronic device including an antenna for reception-side polarization (RX) (e.g., circular polarization) are illustrated. In the graphs, the X-axis denotes a polarization angle of the transmission-side electronic device, and the Y-axis denotes a polarization angle of the reception-side electronic device. If both the transmission-side electronic device and the reception-side electronic device use linear polarization, a mismatch in polarization may occur according to the pose of the transmission-side electronic device and the reception-side electronic device. Errors in position information of the reception-side electronic device may occur. The electronic device disclosed herein may communicate with the linear polarization of the transmission-side electronic device using circular polarization and thus, may receive most signals from the transmission-side electronic device irrespective of the pose of the transmission-side electronic device and accordingly increase the accuracy of AoA. FIGS. 11A to 11C may confirm that the linearity is maintained within a polarization angle range that is substantially usefully used regardless of the poses of both electronic devices.

The range performance deviations according to the pose of the electronic device when the electronic device disclosed herein serves as the reception-side electronic device and uses linear polarization and when the electronic device disclosed herein serves as the reception-side electronic device and uses circular polarization were tested.

(a) When Reception-Side Electronic Device Uses Linear Polarization.

When the transmission-side electronic device uses horizontal polarization, the recognition distance of the reception-side electronic device using vertical polarization was about 6.5 m, and the recognition distance of the reception-side electronic device using horizontal polarization was about 38 m.

When the transmission-side electronic device uses vertical polarization, the recognition distance of the reception-side electronic device using vertical polarization was about 39 m, and the recognition distance of the reception-side electronic device using horizontal polarization was about 7.5 m.

When the transmission-side electronic device uses polarization of about a 45-degree angle, the recognition distance of the reception-side electronic device using vertical polarization was about 25 m, and the recognition distance of the reception-side electronic device using horizontal polarization was about 35 m.

(b) When Reception-Side Electronic Device Uses Circular Polarization.

When the transmission-side electronic device uses horizontal polarization, the recognition distance of the reception-side electronic device using vertical polarization was about 37 m, and the recognition distance of the reception-side electronic device using horizontal polarization was about 35 m.

When the transmission-side electronic device uses vertical polarization, the recognition distance of the reception-side electronic device using vertical polarization was about 37 m, and the recognition distance of the reception-side electronic device using horizontal polarization was about 33 m.

When the transmission-side electronic device uses polarization of about a 45-degree angle, the recognition distance of the reception-side electronic device using vertical polarization was about 35 m, and the recognition distance of the reception-side electronic device using horizontal polarization was about 35 m.

According to the above test, the deviation of the recognition distances of the reception-side electronic device using linear polarization was about 32.5 m, whereas the deviation of the recognition distances of the reception-side electronic device using circular polarization was about 4 m. It may be shown from this that the reception-side electronic device using circular polarization exhibits a relatively stable recognition distance characteristic.

According to various embodiments, an electronic device 301 may include a housing 310 and an antenna 341 positioned in the housing 310, where the antenna 341, 541 may include a first radiating layer 571 including a first radiation patch 581, a slit 583 formed in the first radiation patch 581, and a first feed point 584 positioned in the first radiation patch 581, a second radiating layer 574 including a second radiation patch 586 positioned below the first radiation patch 581 and a second feed point 588 positioned in the second radiation patch 586, a feeding layer 576 including a coupling patch 591 positioned below the second radiation patch 586 and at least one ground point 592*c*, 592*d*, 593*c*, 593*d*, 594*c*, 594*d*, 595*c*, 595*d* positioned in the coupling patch 591, a ground layer 542 positioned below the coupling patch 591, a feed line 543 positioned between the second radiation patch 586 and the ground layer 542 and including a third feed point 596, a signal via 579 connecting the first feeding point 584, the second feeding point 588, and the third feeding point 596, and a ground via 546 connecting the ground point 592*c*, 592*d*, 593*c*, 593*d*, 594*c*, 594*d*, 595*c*, 595*d* and the ground layer 542.

In an embodiment, the coupling patch 576 may include a plurality of coupling sections 592, 593, 594, and 595 forming a coupling pattern.

In an embodiment, the plurality of coupling sections 592, 593, 594, and 595 may include a first section 592 positioned in a first area based on a first imaginary centerline of the feeding layer, and a second section 593 positioned in a second area opposite to the first area based on the first imaginary centerline.

In an embodiment, the plurality of coupling sections 592, 593, 594, and 595 may further include a third section 594 positioned in a third area opposite to the second area based on a second imaginary centerline, intersecting with the first imaginary centerline, of the feeding layer, and a fourth section 595 positioned in a fourth area opposite to the third area based on the first imaginary centerline and opposite to the first area based on the second imaginary centerline.

In an embodiment, the second radiation patch 586 may include an edge 587, where the plurality of coupling sections 592, 593, 594, and 595 may be positioned not to overlap the edge 587 of the second radiation patch 586.

In an embodiment, the plurality of coupling sections 692, 693, 694, and 695 may each include a plurality of subsections 692*a* and 692*b* connected to each other or a plurality of subsections 692*a* and 692*b* separated from each other.

In an embodiment, the plurality of coupling sections 692, 693, 694, and 695 may each include a plurality of subsections 692*a* and 692*b* each having a width W and a length L, where the width W may be greater than the length L, the width W may be substantially equal to the length L, or the width W may be less than the length L.

In an embodiment, the plurality of coupling sections 792, 793, 794, and 795 may each have a width W and a length L, where (a) the feeding layer 776 may include a plurality of ground points 792*c* and 792*d* arranged in a width direction of the plurality of coupling sections 792, 793, 794, and 795, (b) the feeding layer 776 may include a plurality of ground points 792*c* and 792*d* respectively arranged in a width direction and a length direction of the plurality of coupling sections 792, 793, 794, and 795, or (c) the plurality of coupling sections 792, 793, 794, and 795 may each include a plurality of subsections 792*a* and 792*b* connected to each other, and the feeding layer 776 may include at least one ground point 792*c* positioned at a portion where the plurality of subsections 792*a* and 792*b* are connected to each other.

In an embodiment, the first radiation patch 581 may include a plurality of first edges 582, and the second radiation patch 586 may include a plurality of second edges 587, where the first radiation patch 581 may include a first cut area CA1 between a pair of first edges 582 adjacent to each other, and the second radiation patch 586 may include a second cut area CA2 between a pair of second edges 587 adjacent to each other.

In an embodiment, the second radiating layer 574 may further include an annular slot 589 surrounding the second feed point 588.

According to various embodiments, an electronic device 301 may include a housing 310, a PCB 321, 322, 323 positioned in the housing 310, an antenna assembly 340 positioned in the housing 310, and a cover 315 coupled to the housing 310 to cover the PCB 321, 322, 323 and the antenna assembly 340, where the antenna assembly 340 may include a plurality of antennas 341, 541 each including a first radiating layer 571 including a first radiation patch 581, a slit 583 formed in the first radiation patch 581, and a first feed point 584 positioned in the first radiation patch 581, a second radiating layer 574 including a second radiation patch 586 positioned below the first radiation patch 581 and a second feed point 588 positioned in the second radiation patch 586, and a feeding layer 576 including a coupling patch 591 positioned below the second radiation patch 586 and at least one ground point 592*c*, 592*d*, 593*c*, 593*d*, 594*c*, 594*d*, 595*c*, 595*d* positioned in the coupling patch 591, a ground layer 342, 542 positioned below a feeding layer 576 of each of the plurality of antennas 341, 541, a plurality of feed lines 343*a*, 343*b*, 343*c*, and 543 each positioned between the second radiating layer 574 of each of the plurality of antennas 341, 541 and the ground layer 342, 542 and including a third feed point 596, and a connector 344 connecting the plurality of feed lines 343*a*, 343*b*, 343*c*, and 543 to the PCB 321, 322, 323.

In an embodiment, the electronic device 301 may further include a trace 345*a*, 345*b* positioned between a pair of feed lines adjacent to each other to suppress signal interference between the pair of feed lines.

In an embodiment, the ground layer 342 may include an overlap area overlapping the plurality of antennas, where the overlap area may be formed in a mesh structure.

In an embodiment, the ground layer 342 may include an antenna mount area A1, A2, A3 in which the plurality of antennas are positioned, and a wiring connection area A4 in which at least a portion of the plurality of feed lines and the connector are positioned, where the wiring connection area A4 may include a bending area A41 configured to be at least partially bent.

In an embodiment, the electronic device 301 may further include a fastening part 331 positioned between the PCB and the antenna assembly to fasten the PCB and the antenna assembly to the housing.

In an embodiment, the electronic device 301 may further include a damage suppressor 332 positioned between the antenna assembly and the cover to suppress damage to the cover by the antenna assembly.

In an embodiment, the electronic device 301 may further include an impact absorber 316 positioned between the cover and the connector to prevent separation of the connector from the PCB.

In an embodiment, the cover 415 may include a plurality of radiation apertures 416 respectively corresponding to the plurality of antennas.

In an embodiment, the PCB 321, 322, 323 and the antenna assembly 340 may be stacked and mounted in the housing 310.

According to various embodiments, an antenna 541 may include a first radiating layer 571 including a first radiation patch 581, a slit 583 formed in the first radiation patch 581, and a first feed point 584 positioned in the first radiation patch 581, a second radiating layer 574 including a second radiation patch 586 positioned below the first radiation patch 581 and a second feed point 588 positioned in the second radiation patch 586, a feeding layer 576 including a coupling patch 591 positioned below the second radiation patch 586 and at least one ground point 592*c*, 592*d*, 593*c*, 593*d*, 594*c*, 594*d*, 595*c*, 595*d* positioned in the coupling patch 591, a ground layer 542 positioned below the coupling patch 591, a feed line 543 positioned between the second radiation patch 586 and the ground layer 542 and including a third feed point 596, a signal via 579 connecting the first feeding point 584, the second feeding point 588, and the third feeding point 596, and a ground via 546 connecting the ground point 592*c*, 592*d*, 593*c*, 593*d*, 594*c*, 594*d*, 595*c*, 595*d* and the ground layer 542.

Also, while embodiments of the disclosure have been shown and described, the disclosure is not limited to the aforementioned specific embodiments, and it is apparent that various modifications can be made by those having ordinary skill in the art to which the disclosure belongs, without departing from the gist of the disclosure as claimed by the appended claims, and it is intended that such modifications are not to be interpreted independently from the technical idea or prospect of the disclosure.

What is claimed is:

1. An electronic device comprising:
- a housing; and
- an antenna provided in the housing,
- wherein the antenna comprises:
- a first radiating layer comprising a first radiation patch, a slit formed in the first radiation patch, and a first feed point provided in the first radiation patch;
- a second radiating layer comprising a second radiation patch provided below the first radiation patch and a second feed point provided in the second radiation patch;
- a feeding layer comprising a coupling patch provided below the second radiation patch and at least one ground point provided in the coupling patch;
- a ground layer provided below the feeding layer and below the coupling patch;
- a feed line provided between the second radiation patch and the ground layer, the feed line comprising a third feed point;
- a signal via connecting the first feed point, the second feed point, and the third feed point; and
- a ground via connecting the at least one ground point and the ground layer.

2. The electronic device of claim 1, wherein the coupling patch comprises a plurality of coupling sections configured to form a coupling pattern.

3. The electronic device of claim 2, wherein the plurality of coupling sections comprises:
- a first section; and
- a second section provided opposite to the first section based on a first centerline of the feeding layer.

4. The electronic device of claim 3, wherein the plurality of coupling sections further comprises:
- a third section provided opposite to the second section based on a second centerline of the feeding layer, the second centerline intersecting the first centerline; and
- a fourth section provided opposite to the third section based on the first centerline and opposite to the first section based on the second centerline.

5. The electronic device of claim 2, wherein the second radiation patch comprises an edge, and
- wherein the plurality of coupling sections do not overlap the edge of the second radiation patch.

6. The electronic device of claim 2, wherein each of the plurality of coupling sections comprises a plurality of subsections connected to each other or separated from each other.

7. The electronic device of claim 2, wherein each of the plurality of coupling sections comprises a plurality of subsections, and each of the plurality of subsections has a width and a length that is less than the width.

8. The electronic device of claim 2, wherein:
- (a) the feeding layer comprises a plurality of ground points arranged in a width direction of the plurality of coupling sections,
- (b) the feeding layer comprises a plurality of ground points respectively arranged in the width direction and a length direction of the plurality of coupling sections, or
- (c) each of the plurality of coupling sections comprises a plurality of subsections connected to each other, and the at least one ground point of the feeding layer is provided at a portion where the plurality of subsections are connected to each other.

9. The electronic device of claim 1, wherein the first radiation patch comprises a plurality of first edges,
- wherein the second radiation patch comprises a plurality of second edges,
- wherein the first radiation patch comprises a first cut area between a pair of first edges adjacent to each other, and
- wherein the second radiation patch comprises a second cut area between a pair of second edges adjacent to each other.

10. The electronic device of claim 1, wherein the second radiating layer further comprises an annular slot surrounding the second feed point.

11. An electronic device comprising:
- a housing;
- a printed circuit board (PCB) provided in the housing;
- an antenna assembly provided in the housing; and
- a cover coupled to the housing and covering the PCB and the antenna assembly,
- wherein the antenna assembly comprises:
  - a plurality of antennas, each of the plurality of antennas comprising:
    - a first radiating layer comprising a first radiation patch, a slit formed in the first radiation patch, and a first feed point provided in the first radiation patch;

a second radiating layer comprising a second radiation patch provided below the first radiation patch and a second feed point provided in the second radiation patch; and a feeding layer comprising a coupling patch provided below the second radiation patch and at least one ground point provided in the coupling patch;

a ground layer provided below the feeding layer of each of the plurality of antennas;

a plurality of feed lines each provided between the second radiating layer of each of the plurality of antennas and the ground layer, each of the plurality of feed lines comprising a third feed point; and a connector connecting the plurality of feed lines to the PCB.

12. The electronic device of claim 11, further comprising:

a trace provided between a pair of feed lines adjacent to each other and configured to suppress signal interference between the pair of feed lines.

13. The electronic device of claim 11, wherein the ground layer comprises an overlap area overlapping the plurality of antennas and formed in a mesh structure.

14. The electronic device of claim 11, wherein the ground layer comprises:

an antenna mount area in which the plurality of antennas are provided; and a wiring connection area in which at least a portion of the plurality of feed lines and the connector are provided, and wherein the wiring connection area comprises a bending area configured to be at least partially bent.

15. The electronic device of claim 11, further comprising:

a fastening part provided between the PCB and the antenna assembly and configured to fasten the PCB and the antenna assembly to the housing.

16. The electronic device of claim 11, further comprising:

a damage suppressor provided between the antenna assembly and the cover and configured to suppress damage to the cover caused by the antenna assembly.

17. The electronic device of claim 11, further comprising:

an impact absorber provided between the cover and the connector and configured to prevent separation of the connector from the PCB.

18. The electronic device of claim 11, wherein the cover comprises a plurality of radiation apertures respectively corresponding to the plurality of antennas.

19. The electronic device of claim 11, wherein the PCB and the antenna assembly are stacked and mounted in the housing.

20. An antenna comprising:

a first radiating layer comprising a first radiation patch, a slit formed in the first radiation patch, and a first feed point provided in the first radiation patch;

a second radiating layer comprising a second radiation patch provided below the first radiation patch and a second feed point provided in the second radiation patch;

a feeding layer comprising a coupling patch provided below the second radiation patch and at least one ground point provided in the coupling patch;

a ground layer provided below the feeding layer and below the coupling patch;

a feed line provided between the second radiation patch and the ground layer and comprising a third feed point;

a signal via connecting the first feed point, the second feed point, and the third feed point; and a ground via connecting the at least one ground point and the ground layer.

* * * * *